(12) United States Patent
Kaneko

(10) Patent No.: US 6,552,767 B1
(45) Date of Patent: Apr. 22, 2003

(54) LIQUID-CRYSTAL DISPLAY

(75) Inventor: Yasushi Kaneko, Sayama (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 09/673,193

(22) PCT Filed: Feb. 15, 2000

(86) PCT No.: PCT/JP00/00819

§ 371 (c)(1),
(2), (4) Date: Oct. 12, 2000

(87) PCT Pub. No.: WO00/48039

PCT Pub. Date: Aug. 17, 2000

(30) Foreign Application Priority Data

Feb. 15, 1999 (JP) .............................. 11-035309
Jun. 7, 1999 (JP) .............................. 11-159226

(51) Int. Cl.$^7$ ...................... G02F 1/1335; G02F 1/1336
(52) U.S. Cl. ...................... 349/119; 349/113; 349/114
(58) Field of Search .................. 349/113, 117, 349/119, 114, 179; 252/299.1

(56) References Cited

U.S. PATENT DOCUMENTS

| | | | | |
|---|---|---|---|---|
| 5,548,422 A | * | 8/1996 | Conner et al. | 349/117 |
| 5,999,240 A | * | 12/1999 | Sharp et al. | 349/119 |
| 6,108,064 A | * | 8/2000 | Minoura et al. | 349/113 |
| 6,175,399 B1 | * | 1/2001 | Mitsui et al. | 349/113 |
| 6,204,904 B1 | * | 3/2001 | Tillin et al. | 349/113 |
| 6,219,122 B1 | * | 4/2001 | Uchida et al. | 252/299.1 |

FOREIGN PATENT DOCUMENTS

| | | | |
|---|---|---|---|
| EP | 0803758 A2 | 10/1997 | |
| JP | 64-50019 | 2/1989 | |
| JP | 4-97121 | 3/1992 | |
| JP | 4-229828 | 8/1992 | |
| JP | 04282613 | 10/1992 | |
| JP | 4-282613 | 10/1992 | |
| JP | 4-322221 | 11/1992 | |
| JP | 10-123505 | 5/1998 | |
| JP | 410123505 | * 5/1998 | ......... G02F/1/1335 |
| JP | 10-260399 | 9/1998 | |
| JP | 10-282488 | 10/1998 | |

OTHER PUBLICATIONS

European Search Report dated May 14, 2001.

* cited by examiner

*Primary Examiner*—Robert H. Kim
*Assistant Examiner*—P. R. Akkapeddi
(74) *Attorney, Agent, or Firm*—Armstrong, Westerman & Hattori, LLP

(57) ABSTRACT

A reflection-type liquid crystal display device of single polarizing film type, comprises a liquid crystal element (20) comprised of twisted nematic liquid crystal (6) sandwiched between a first substrate (1) provided with a reflector (7) and first electrodes (3), and a second substrate (2) provided with second electrodes (4), and a twisted retardation film (12), a first retardation film (13), a second retardation film (14), a polarizing film (11) that are disposed in sequence on the outer side of the second substrate (2), so that black display having a low reflectance is obtained over the all-wavelength region, thereby effecting bright display in high contrast.

23 Claims, 13 Drawing Sheets

LIQUID-CRYSTAL DISPLAY

TECHNICAL FIELD

This invention relates to the construction of liquid crystal display devices. In particular, the invention is concerned with a reflection-type liquid crystal display device and a transflective liquid crystal display device of single polarizing film type, for effecting bright display in black and white or in color by means of a reflector and a sheet of polarizing film provided in a liquid crystal element of the device.

BACKGROUND TECHNOLOGY

For a reflection-type liquid crystal display device, there has been mainly adopted a construction wherein a TN (twisted nematic) liquid crystal element or a STN (supertwisted nematic) liquid crystal element is disposed between a pair of polarizing films, and a reflector is installed on the outer side of one of the polarizing films.

With such a reflection-type liquid crystal display device, however, external light passes through each of two sheets of the polarizing films twice from the time when the external light enters from the visible side of the device until it goes out towards the visible side after reflected by a reflector, so that reduction in light quantity is increased, thereby lowering brightness of images in display. Moreover, since the reflector is installed on the outer side of a glass substrate of the liquid crystal element, there has arisen a problem that shadows appear on display.

To cope with the problem, a single polarizing film type liquid crystal display device, capable of effecting display with just one sheet of polarizing film, has since been proposed. With such a liquid crystal display device having only one sheet of polarizing film, reduction in light quantity can be decreased in comparison with the case of a conventional reflection-type liquid crystal display device employing two sheets of polarizing films, thereby improving brightness of images in display.

Further, with the single polarizing film type liquid crystal display device, it is possible to solve the problem of the shadows appearing on display by forming a reflector inside a liquid crystal display element.

Such a single polarizing film type liquid crystal display device is comprised of one sheet of polarizing film, one sheet of retardation film, and a liquid crystal element incorporating a reflector, as disclosed in, for example, Japanese Patent Laid-Open Publication No. 4-97121 (JP, 04-97121, A).

With such a conventional single polarizing film type liquid crystal display device as described above, however, a problem has been encountered that excellent black display can not be effected, and contrast becomes low.

In order to effect excellent black display, a low reflectance (a ratio of an outgoing light quantity to an incident light quantity as seen from the visible side) needs to be achieved in black display parts at all wavelengths in the visible light region. However, with the single polarizing film type liquid crystal display device, employing one sheet of retardation film described above, a low reflectance can be achieved for light rays at specific wavelengths, but it is impossible to achieve a low reflectance for light rays over all wavelengths.

Accordingly, there has since been developed a single polarizing film type liquid crystal display device employing two sheets of retardation films for effecting excellent black display, however, it is still a long way off from obtaining good contrast.

Further, there has since been developed a single polarizing film type liquid crystal display device, employing a compensating layer having an orientation rotated in the direction opposite to a twist direction of a liquid crystal layer, in place of the retardation film as disclosed in, for example, Japanese Patent Laid-Open Publication No. 10-123505 (JP, 10-123505, A). Even with such a construction, it has been difficult to achieve a low reflectance over all wavelengths, and consequently, good contrast has not been obtained.

Furthermore, with the conventional single polarizing film type liquid crystal display device of described in the foregoing, it is not possible to install a backlight because the reflector does not allow light rays to pass therethrough, so that display can not be seen at places where external light is weak or at night.

Accordingly, there has been developed a transflective liquid crystal display device, employing a half mirror made of a thin film of aluminum formed by the vapor deposition method or the sputtering method, or having a reflector provided with an opening for every pixel, so that display is effected by light rays emitted from a backlight at places where external light is weak or at night.

In the case of the single polarizing film type liquid crystal display device, at the time of reflective display using external light when incident light passes through a liquid crystal element back and forth, the liquid crystal element and optical elements such as a retardation film, and so forth, need to be designed such that display in excellent black and white can be obtained by controlling outgoing of reflected light with a sheet of the polarizing film.

On the other hand, at the time of transmissive display using a backlight, since light emitted from the backlight passes through the liquid crystal element only once, the liquid crystal element and the optical elements need to be designed such that display in excellent black and white can be obtained in such a condition as described above by controlling outgoing of reflected light with one sheet of the polarizing film. For these reasons, it has been difficult to obtain high contrast in both reflective display and transmissive display.

A liquid crystal display device having a reflector provided with an opening for every pixel has been disclosed in, for example, Japanese Patent Laid-open No. H 10-282488 (JP, 10-282488, A), however, no description on the conditions concerning a liquid crystal element and optical elements has been given therein at all, and no description on how to achieve good contrast at the time in both reflective display and transmissive display has been given therein at all.

The invention has been developed in view of the technical background described above, and an object of the invention is to provide a single polarizing film type liquid crystal display device to realize bright display in high contrast by obtaining excellent black display at low reflectance for light rays over all wavelengths.

Further, it is another object of the invention to provide a single polarizing film type liquid crystal display device, capable of effecting reflective display by use of external light and transmissive display by lighting up a backlight, and achieving high contrast at the time in both reflective display and transmissive display.

DISCLOSURE OF THE INVENTION

In order to achieve the objects described above, the liquid crystal display device according to the invention comprises a liquid crystal element comprised of twisted nematic liquid crystal sandwiched between a first substrate provided with a reflector and first electrodes and a second substrate provided with second electrodes, and a twisted retardation film, a first retardation film, a second retardation film, and a polarizing film, that are installed on the outer side (the side facing away from the twisted nematic liquid crystals) of the second substrate in sequence from the second substrate side towards the visible side, thus constituting a reflection-type liquid crystal display device of single polarizing film type.

With the liquid crystal display device, it is desirable that a twist direction of the twisted retardation film is opposite to a twist direction of the liquid crystal element, a twist angle of the twisted retardation film is substantially equal to a twist angle of the liquid crystal element, preferably the twist angle of the twisted retardation film is slightly greater than the twist angle of the liquid crystal element, and a Δnd value indicating birefringent tendency of the twisted retardation film is substantially equal to a Δnd value of the liquid crystal element.

Further, a phase delay axis of the first retardation film preferably crosses a phase delay axis of the second retardation film substantially at right angles, and wavelength-dependency of retardation value of the first retardation film preferably differs from wavelength dependency of retardation value of the second retardation film.

Or the phase delay axis of the first retardation film may cross the phase delay axis of the second retardation film so as to form substantially an angle of 60° therebetween, and the retardation value of the first retardation film may be substantially equivalent to a quarter-wavelength while the retardation value of the second retardation film may be substantially equivalent to a half-wavelength.

Further, with any of these liquid crystal display devices, color filters may be installed either on the nematic liquid crystal side of the first substrate than the reflector, or on the nematic liquid crystal side of the second substrate, thereby constituting a color liquid crystal display device.

With any of these liquid crystal display devices, a diffusion film is preferably installed on the outer face of the second substrate.

The first electrodes may be formed of a reflective material so as to double as the reflector, rendering it unnecessary to install the reflector separately.

The liquid crystal display device according to the invention may comprise a liquid crystal element comprised of twisted nematic liquid crystal sandwiched between a first substrate provided with a transflective reflector and first electrodes and a second substrate provided with second electrodes, and a twisted retardation film, a first retardation film, a second retardation film, and a first polarizing film, that are installed on the outer side (the side facing away from the twisted nematic liquid crystals) of the second substrate in sequence from the second substrate side towards the visible side, together with a third retardation film, a second polarizing film, and a backlight that are disposed in sequence on the outer side of the first substrate, wherein retardation value of the third retardation film are substantially equivalent to a quarter-wavelength, thereby constituting a transflective liquid crystal display device of single polarizing film type.

Further, it is desirable that a fourth retardation film is installed between the third retardation film and the second polarizing film, a phase delay axis of the third retardation film crosses a phase delay axis of the fourth retardation film so as to form substantially an angle of 60° therebetween, and the retardation value of the third retardation film are substantially equivalent to a quarter-wavelength while retardation value of the fourth retardation film are substantially equivalent to a half-wavelength.

Otherwise, the phase delay axis of the third retardation film may cross the phase delay axis of the fourth retardation film substantially at right angles, wavelength-dependency of the retardation value of the third retardation film may differ from wavelength-dependency of the retardation value of the fourth retardation film, and the difference between the retardation value of the third retardation film and the retardation value of the fourth retardation film may be substantially equivalent to a quarter-wavelength.

Also, it is desirable that the twist direction of the twisted retardation film is opposite to the twist direction of the liquid crystal element, the twist angle of the twisted retardation film is substantially equal to the twist angle of the liquid crystal element, preferably the twist angle of the twisted retardation film is slightly greater than the twist angle of the liquid crystal element, the Δnd value indicating birefringent tendency of the twisted retardation film is substantially equal to the Δnd value of the liquid crystal element, the phase delay axis of the first retardation film crosses the phase delay axis of the second retardation film so as to form substantially an angle of 60° therebetween, and the retardation value of the first retardation film are substantially equivalent to a quarter-wavelength while the retardation value of the second retardation film are substantially equivalent to a half-wavelength.

Or the phase delay axis of the first retardation film may cross the phase delay axis of the second retardation film substantially at right angles, wavelength-dependency of the retardation value of the first retardation film may differ from wavelength-dependency of the retardation value of the second retardation film, and the difference between the retardation value of the first retardation film and the retardation value of the second retardation film may be substantially equivalent to a quarter-wavelength.

Further, with any of these liquid crystal display devices, color filters may be installed either on the nematic liquid crystal side of the first substrate than the reflector, or on the nematic liquid crystal side of the second substrate, thereby constituting a color liquid crystal display device.

Further, with any of these liquid crystal display devices, a diffusion film is preferably installed on the outer face of the second substrate.

Furthermore, the transflective reflector may be composed of a thin metal film having a thickness in a range of 0.01 to 0.03 μm. Otherwise, the transflective reflector may be composed of a thin metal film provided with an opening at every spot corresponding to respective pixels.

As described in the foregoing, for the liquid crystal display device according to the invention, one sheet of the twisted retardation film and two sheets of the retardation films are used as optical elements of a single polarizing film type liquid crystal display device of. By causing the twist direction of the twisted retardation film to be opposite to the twist direction of the liquid crystal element, and by causing the twist angle and the Δnd value indicating birefringent tendency of the twisted retardation film to be substantially equal to the twist angle and the Δnd value of the liquid crystal element, it is possible to fully compensate birefringency of the liquid crystal element.

Further, with the use of two sheets of the retardation films, it becomes possible to change wavelength-dependency of retardation values, thereby enabling a so-called wide-band quarter-wavelength film to be formed. With the wide-band quarter-wavelength film, retardation values in a short-wavelength region become smaller, and retardation values in a long-wavelength region become larger. As a result, the quotient $F/\lambda$, a retardation value F divided by a wavelength $\lambda$ can be rendered approximately one quarter over all wavelengths.

It follows therefore that, in effect, the wide-band quarter-wavelength film is disposed on top of the reflector, and the polarizing film is disposed on top of the wide-band quarter-wavelength film. If the polarizing film is disposed such that a transmission axis thereof is at 45° relative to the phase delay axis of the wide-band quarter-wavelength film, incident linearly polarized light is turned into circularly polarized light at all wavelengths, and upon passing through the wide-band quarter-wavelength film again after reflected by the reflector, the circularly polarized light is turned into linearly polarized light with its direction of polarization rotated through 90° at all wavelengths, which is then absorbed by the polarizing film, thereby indicating perfect black display.

That is, at the time of reflective display, by use of one sheet of the twisted retardation film and two sheets of the retardation films, the birefringent tendency of the liquid crystal element can be fully compensated by the twisted retardation film, and reflectance at all wavelengths can be lowered by forming the wide-band quarter-wavelength film with the two sheets of the retardation films. As a result, excellent black display can be obtained, thus enabling display in high contrast to be effected.

Meanwhile, in the case of the transflective liquid crystal display device, operation at the time of reflective display is the same as that of the reflection-type liquid crystal display device described in the foregoing. However, at the time of transmissive display, light emitted from the backlight is transmitted through the polarizing film and the retardation film having retardation value equivalent to a quarter-wavelength which are installed on the backside of the liquid crystal element, and is further transmitted through the transflective reflector before falling on the liquid crystal element. Since birefringent tendency of the liquid crystal element is fully compensated by the twisted retardation film, light undergoes no change in polarization state even when passing through the liquid crystal element and the twisted retardation film, and falls on the wide-band quarter-wavelength film provided on the visible side of the liquid crystal element.

By disposing the wide-band quarter-wavelength film provided on the visible side of the liquid crystal element such that retardation value thereof is subtracted from retardation value of the retardation film installed on the backside of the liquid crystal element, the light emitted from the backlight arrives at the polarizing film on the visible side as it is. Accordingly, if the polarizing film on the backlight side and the polarizing film on the visible side are disposed such that respective transmission axes cross each other at right angles, excellent black display can be effected.

In a state where a voltage is applied to the liquid crystal element, the birefringent tendency of the liquid crystal element undergo change, so that excellent white display can be effected at the time of reflective display as well as the time of transmissive display, thereby enabling display in high contrast to be obtained at both the time of reflective display and the time of transmissive display.

BEST MODE FOR CARRYING OUT THE INVENTION

Preferred embodiments of a liquid crystal display device according to the invention will be described in detail hereinafter with reference to the accompanying drawings.

FIRST EMBODIMENT

FIGS. 1 to 5, FIGS. 11 and 12

A first embodiment of a liquid crystal display device according to the invention is described with reference to FIGS. 1 and 2.

Figure 1:
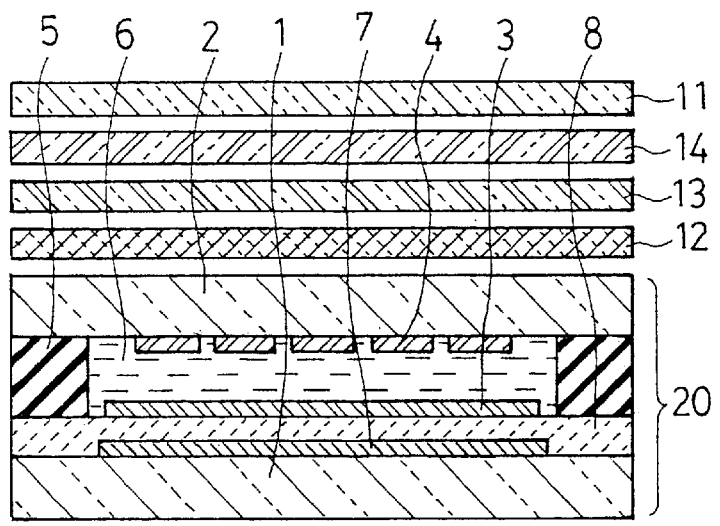
FIG. 1 is a schematic sectional view showing the constitution of a first embodiment of a liquid crystal display device according to the invention.
Figure 2:
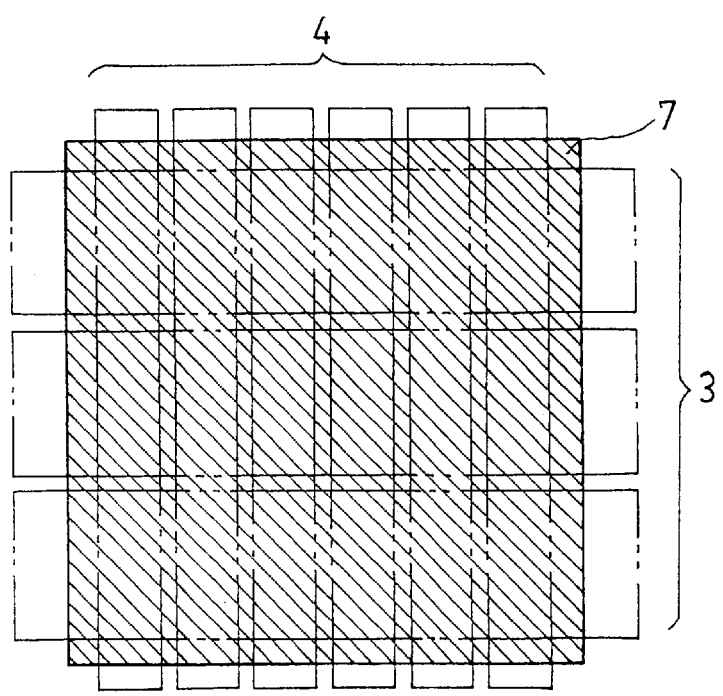
FIG. 2 is a plan view showing a planar layout relationship among a reflector, first electrodes, and second electrodes of the liquid crystal display device.

FIG. 1 is a schematic sectional view showing the constitution of the liquid crystal display device, and FIG. 2 is a plan view showing a planar layout relationship among a reflector, first electrodes, and second electrodes, installed in the device.

As shown in FIG. 1, the liquid crystal display device is comprised of a liquid crystal element 20, and a twisted retardation film 12, a first retardation film 13, a second retardation film 14, and a polarizing film 11 that are disposed in sequence on the outer side (a side opposite from the side facing nematic liquid crystal: the visible side) of a second substrate 2 of the liquid crystal element 20, thereby constituting a reflection-type liquid crystal display device of single polarizing fil-type.

The polarizing film 11, the second retardation film 14, the first retardation film 13, and the twisted retardation film 12 are integrally bonded with each other by use of an acrylic adhesive, and are pasted to the outer face of the second substrate 2 of the liquid crystal element 20 by use of an acrylic adhesive.

The liquid crystal element 20 is comprised of: a first substrate 1 and the second substrate 2, made up of a glass sheet 0.5 mm thick, respectively, and bonded with each other at the periphery thereof with a sealant 5; and nematic liquid crystal 6 aligned so as to be twisted through 240 degrees left-handed and sealed in a gap formed therebetween to be held therein-between.

On the inner face of the first substrate 1, a reflector 7 made of aluminum 0.2 μm thick, and a protective film 8 made of an acrylic material 2 μm thick, covering the reflector 7, are formed, and first electrodes 3 are formed further on top of the protective film 8.

On the inner face of the second substrate 2, second electrodes 4 are formed. Both the first electrodes 3 and the second electrodes 4 are made up of an indium tin oxide (ITO) film which is a transparent and electrically conductive film, and are patterned in a multitude of stripes in such a way as to cross each other at right angles, as shown in FIG. 2. Spots where the first electrodes 3 and the second electrodes 4 cross and superpose each other, respectively, constitute respective pixels. An alignment film (although not shown) is formed on the protective film 8 of the first substrate 1 with the first electrodes 3 formed thereon, and on the inner face of the second substrate 2 with the second electrodes 4 formed thereon, respectively.

Transmittance of the first electrodes 3 and the second electrodes 4, made up of the ITO film, is important in respect of brightness. The lower a sheet resistance value of the ITO film, the thicker the thickness of the film becomes, thereby lowering transmittance.

With this embodiment, data signals are applied to the second electrodes 4, and accordingly, an ITO film having a sheet resistance value at about 100 ohms, and a thickness in the order of 0.05 μm is used for the second electrodes 4 so that the effect of cross talk can be reduced. An average transmittance of the ITO film is about 92%.

Further, scanning signals are applied to the first electrodes 3, and accordingly, an ITO film having a sheet resistance value at about 10 ohms, and a thickness in the order of 0.3 μm is used for the first electrodes 3 in order to reduce cross talk. An average transmittance of the ITO film is a little lower at about 89%, however, brightness of images in display can be improved by use of a transparent electrode having a transmittance at 90% or more for at least one of the electrodes.

The twisted retardation film 12 is a film made of a liquid crystalline high polymer of a twist structure, applied to a triacetyl cellulose (TAC) film or a polyethylene telephthalate (PET) film after an alignment treatment, rendered into liquid crystal state at a high temperature of about 150° C., and rapidly cooled to room temperature after adjustment of a twist angle so as to fix a twist condition thereof.

Otherwise, the twisted retardation film 12 may be formed by transferring a liquid crystalline high polymer with a fixed twist condition thereof to a TAC film which is separately prepared and to which an alignment layer treatment has been applied.

With this embodiment, the twisted retardation film 12 having a twist angle Tc at −240°, a Δnd value Rc, indicating a birefringent tendency, at 0.80 μm, and a right-handed twist direction is used.

The polarizing film 11 is preferably as bright as possible, and its polarization degree is preferably as high as possible. With this embodiment, material having a polarization degree of 99.9% at a transmittance of 45% is used for the polarizing film.

If an anti-reflection layer having a reflectance in the order of 0.5% is provided by coating the surface of the polarizing film 11 with inorganic thin films in a plurality of layers, differing in reflectance, by use of the vapor deposition method or the sputtering method, surface reflectance of the polarizing film 11 is lowered and transmission is improved so that brightness of images is enhanced. Also, since a blackness level is lowered, contrast is improved as well.

However, since the inorganic thin films is expensive, there has been developed a coat-type anti-reflection layer coated with an organic material in one to two layers. Such an anti-reflection layer has a somewhat high reflectance around 1%, however, its price is low. The above-described anti-reflection layer is good enough for use as the anti-reflection layer of the liquid crystal display device.

The first retardation film 13 is a transparent film about 70 $\mu$m thick, formed by drawing polycarbonate (PC), and has a retardation value F1 of 0.36 $\mu$m at a wavelength of 0.55 $\mu$m.

The second retardation film 14 is a transparent film about 100 $\mu$m thick, formed by drawing polypropylene (PP), and has a retardation value F2 of 0.50 $\mu$m at a wavelength of 0.55 $\mu$m.

Hereinafter, a layout relationship among respective constituent members is described with reference to FIGS. 3 and 4.

Figure 3:
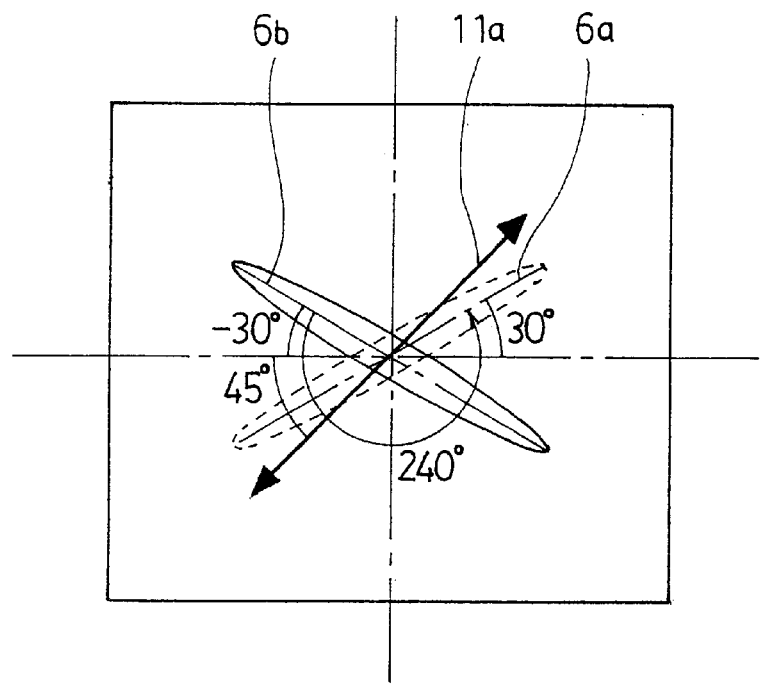
FIG. 3 is a schematic illustration showing a relationship between the direction of a transmission axis of a polarizing film and a twist angle of nematic liquid crystal of a liquid crystal element of the liquid crystal display device.

An alignment film (not shown) is formed on the surface of the first electrodes 3 as well as the second electrodes 4 of the liquid crystal element 20, and as shown in FIG. 3, a lower molecular alignment direction 6a of the nematic liquid crystal 6 points at +30° by applying a rubbing treatment to the inner face of the first substrate 1 in the direction extending upward to the right at 30° to the horizontal axis while an upper molecular alignment direction 6b of the nematic liquid crystal 6 points at −30° by applying a rubbing treatment to the inner face of the second substrate 2 in the direction extending downward to the right at 30° to the horizontal axis. Generally, an angle of clockwise rotation is expressed in minus, and an angle of counterclockwise rotation is expressed in plus.

The liquid crystal element 20 of STN mode, having a twist angle Ts of 240° counterclockwise, is made up by adding an optical rotatory substance called chiral to the nematic liquid crystal 6 having a viscosity at 20 cp, and adjusting a twist pitch P to 11 $\mu$m.

A birefringence difference $\Delta$n of the nematic liquid crystal 6 is set at 0.15, and a cell gap d which is a gap between the first substrate 1 and the second substrate 2 is set at 5.6 $\mu$m. Accordingly, a $\Delta$nd value Rs indicating the birefringent tendency of the liquid crystal element 20 as expressed by the product of the birefringence difference $\Delta$n of the nematic liquid crystal 6 and the cell gap d becomes 0.84 $\mu$m.

The polarizing film 11 is disposed such that a transmission axis 11a thereof forms an angle of +45° on the basis of the horizontal axis.

Figure 4:
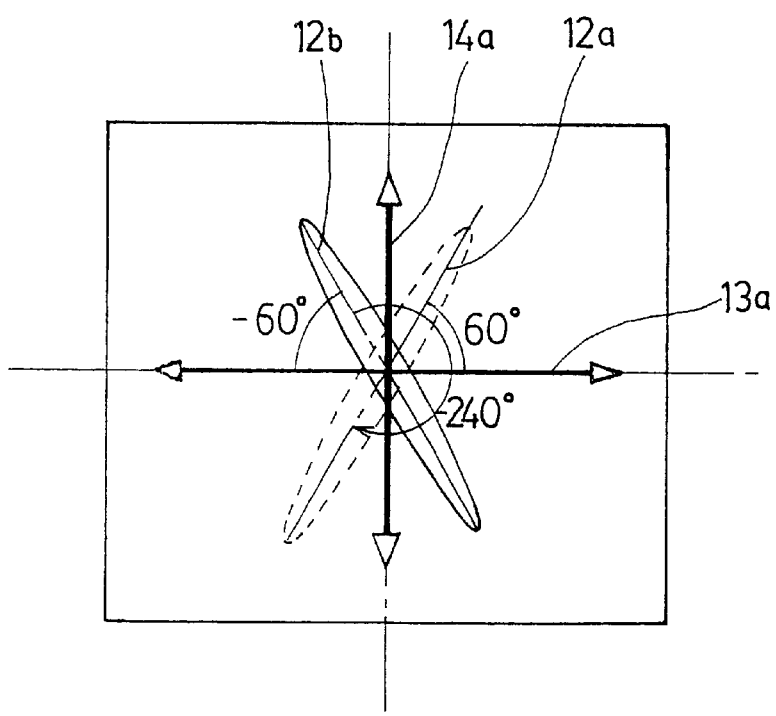
FIG. 4 is a schematic illustration showing a relationship among the direction of respective phase delay axes of first and second retardation films, and a twist angle of a twisted retardation film of the liquid crystal display device.

As shown in FIG. 4, a lower molecular alignment direction 12a of the twisted retardation film 12 is +60° on the basis of the horizontal axis, and an upper molecular alignment direction 12b thereof is −60° on the basis of the horizontal axis. Accordingly, the twist direction of the twisted retardation film 12 is clockwise, and a twist angle Tc thereof becomes −240°. Assuming that a difference in absolute value between the twist angle of the liquid crystal element 20 and that of the twisted retardation film 12 is $\Delta$T, $\Delta$T=|Ts|−|Tc|=0°. Further, a $\Delta$nd value Rc indicating the birefringent tendency of the twisted retardation film 12 is 0.80 $\mu$m, and assuming that a difference with the $\Delta$nd value Rs of the liquid crystal element 20 is $\Delta$R, $\Delta$R=Rs−Rc=0.04 $\mu$m.

That is, the twist direction of the twisted retardation film 12 is opposite to that of the liquid crystal element 20, and the twist angles of both are equivalent to each other (need only be substantially equivalent) while the $\Delta$nd values of both are substantially equivalent to each other as well.

As shown in FIG. 4, the first retardation film 13 is disposed such that a phase delay axis 13a thereof is oriented horizontally, and the second retardation film 14 is disposed such that a phase delay axis 14a thereof is oriented vertically, so that the phase delay axis 13a and the phase delay axis 14a cross each other at right angles.

Accordingly, the retardation value F1 of the first retardation film 13 and the retardation value F2 of the second retardation film are subjected to subtraction, so that an effective retardation value is $\Delta$F=F2−F1=0.14 $\mu$m.

Advantageous effects of the liquid crystal display device according to the first embodiment are described hereinafter with reference to FIGS. 11 and 12 as well.

With the liquid crystal display device, as described in the foregoing, the twist angle Tc and the $\Delta$nd value Rc of the twisted retardation film 12 are set to be substantially equivalent to the twist angle Ts and the $\Delta$nd value Rs of the liquid crystal element 20, respectively, and further, as shown in FIG. 4, by disposing the twisted retardation film 12 such that the upper and lower molecular alignment directions 12b, 12a thereof are orthogonal to the lower and upper molecular alignment directions 6a, 6b of the liquid crystal element 20 shown FIG. 3, respectively, birefringent tendency that will occur in the liquid crystal element 20 will be fully compensated, thus preventing occurrence of birefringence.

In practice, since a tilt angle indicating an inclination of the molecules of the nematic liquid crystal 6 inside the liquid crystal element 20 is greater than a tilt angle of the twisted retardation film 12, it is preferable to set the $\Delta$nd value Rc of the twisted retardation film 12 to a value a little smaller than the $\Delta$nd value Rs of the liquid crystal element 20 from the viewpoint of fully compensating the birefringence described above.

Also, it is more preferable to match wavelength dependency of the refractive index of the liquid crystal molecules of the nematic liquid crystal 6 with wavelength dependency of the refractive index of liquid crystal polymer molecules of the twisted retardation film 12.

Even if the twist angle Tc of the twisted retardation film 12 differs from the twist angle Ts of the liquid crystal element 20, this allows the compensation to be effected to some extent.

The results of experiments showed that the compensation was effected when the twist angle Tc of the twisted retardation film 12 was within a range of the twist angle Ts (of the liquid crystal element 20) ±20°, but the compensation was best effected when Tc is substantially equivalent to Ts, and Tc is slightly larger than Ts.

Figure 5:
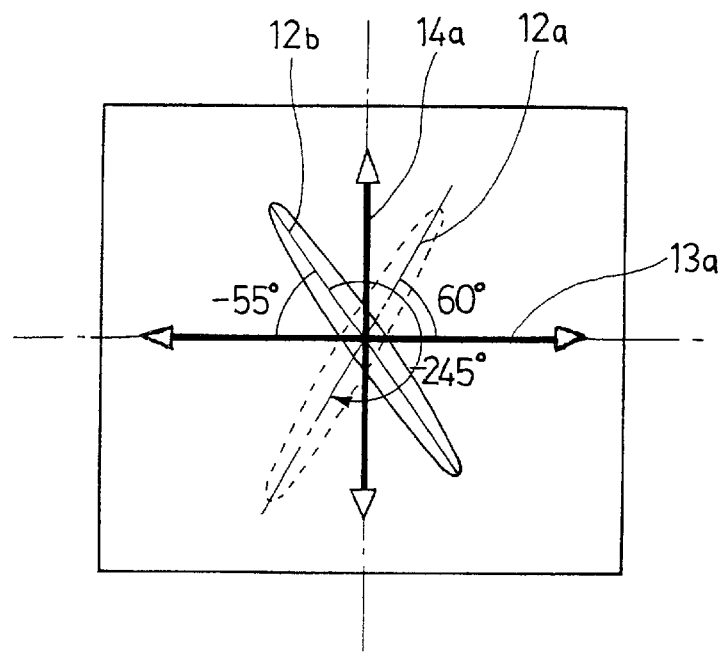
FIG. 5 is a schematic illustration similar to FIG. 4, showing a more preferable example.

FIG. 5 shows a relationship among the direction of phase delay axes 13a, 14a of the first and second retardation films and the upper molecular alignment direction 12b of the twisted retardation film 12 and the lower molecular alignment direction 12a thereof in the case where Tc=−245°, greater by 5° in absolute value than Ts (240°). In this case, optimum compensation was effected.

Then, the effect of the retardation films is described hereinafter. FIG. 11 shows wavelength dependency of retardation value of the retardation films used in carrying out this embodiment. The horizontal axis indicates light wavelengths (unit: $\mu$m), and the vertical axis the retardation values (unit: $\mu$m) of the retardation films.

Figure 11:
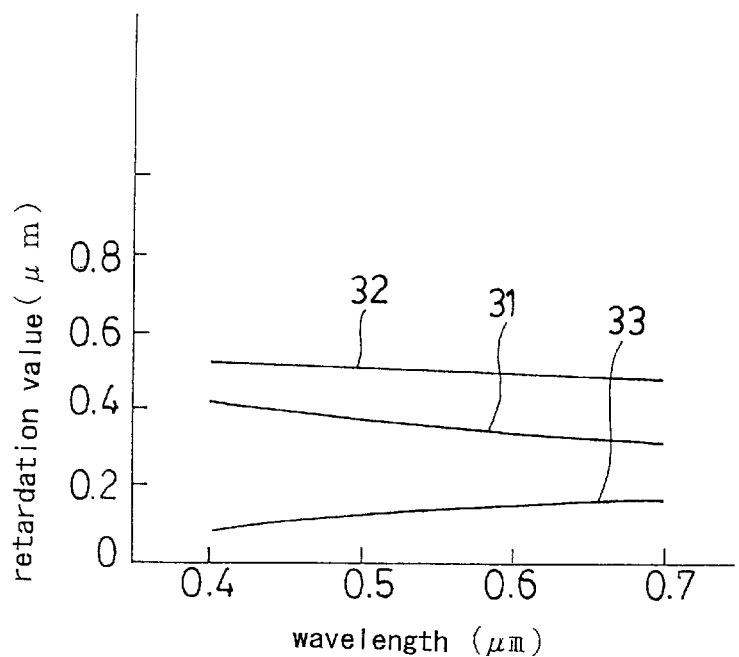
FIG. 11 is a diagram showing wavelength-dependency of retardation values of retardation films used in the liquid crystal display device according to the invention.

In FIG. 11, curves 31, 32 indicate the retardation value of the first and second retardation films 13, 14, respectively, and a curve 33 indicates a retardation value when the second retardation film 14 is superposed on the first retardation film 13 such that respective phase delay axes cross each other at right angles.

Since the constituent material of the first retardation film 13 is polycarbonate (PC) having a large wavelength-dependency of refractive index, hence retardation values for light rays at short wavelengths undergo an increase as shown by the curve 31. On the other hand, the constituent material of the second retardation film 14 being polypropylene (PP) having a small wavelength-dependency of reflectance, retardation values for light rays at short wavelengths are substantially the same as those for light rays at long wavelengths, hardly undergoing any change as shown by the curve 32.

Accordingly, by superposing the second retardation film 14 on the first retardation film 13 such that the respective phase delay axes cross each other at right angles so as to decrease a retardation value, retardation values for light rays at short wavelengths around 0.4 μm can be rendered smaller than those for light rays at long wavelengths around 0.7 μm as shown by the curve 33.

Generally, linearly polarized light falling on a retardation film (quarter-wavelength film), having a retardation value equivalent to one quarter of light wavelength λ, with its polarization axis oriented at 45° to the phase delay axis of the retardation film, can be converted into circularly polarized light.

Accordingly, with a configuration wherein a polarizing film, a quarter-wavelength film and a reflector are disposed so as to be superposed one after another in this order from the incident side of light, linearly polarized light falling through the polarizing film is turned into circularly polarized light at the quarter-wavelength film, is reflected at the reflector, and is transmitted through the quarter-wavelength film again, whereupon the direction of polarization is rotated through 90°, and the circularly polarized light reverts to linearly polarized light, which is absorbed by the polarizing film, thereby indicating black display.

With an ordinary quarter-wavelength film, however, since retardation values for light rays at short wavelengths are larger than those for light rays at long wavelengths, the quotient of a retardation value divided by a wavelength in the range of short wavelengths is larger than one quarter while the same in the range of long wavelengths is smaller than one quarter. As a result, perfect circularly polarized light can not be obtained, so that perfect black can not be indicated.

For this reason, as in this embodiment, by use of two sheets of the retardation films each having a different wavelength dependency of refractive index, it becomes possible to form a so-called wide-band quarter-wavelength film wherein retardation values in a short wavelength region are smaller than those in a long wavelength region. That is, the quotients of retardation values divided by wavelengths can be rendered approximately one quarter over the entire visible light region. Consequently, circularly polarized light can be obtained in all wavelength regions, so that perfect black in display can be obtained.

Figure 12:
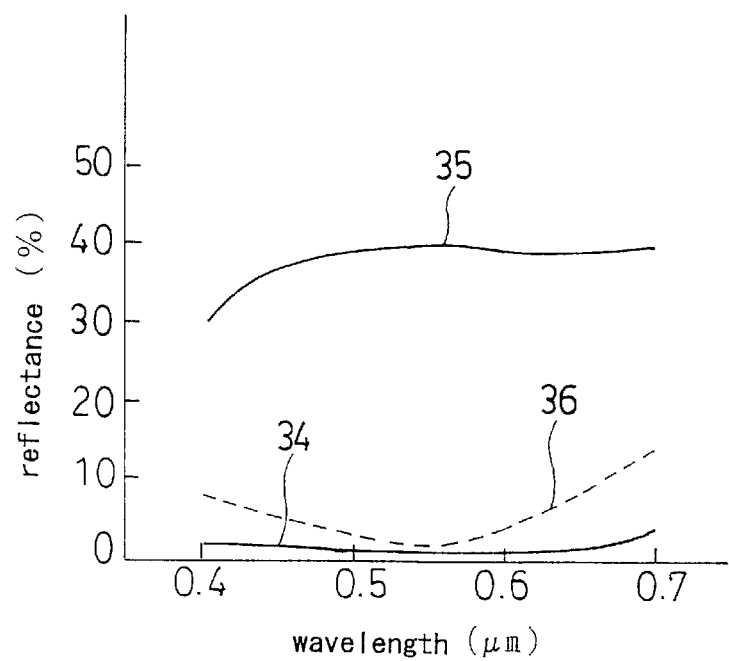
FIG. 12 is a diagram showing a spectral reflectance curve of the liquid crystal display device according to the invention.

FIG. 12 shows reflection characteristics of the single polarizing film type liquid crystal display device according to this embodiment. A curve 34 indicates reflectance in a black display state when no voltage is applied between the first electrodes 3 and the second electrodes 4 inside the liquid crystal element 20, and a curve 35 indicates reflectance in a white display state when a predetermined voltage is applied. For the sake of comparison, a curve 36 indicates reflectance in a black display state of a single polarizing film type liquid crystal display device, wherein a quarter-wavelength film comprised of a single retardation film made of ordinary polycarbonate (PC) is used for a retardation film, when no voltage is applied. Herein, reflectance refers to a ratio (%) of an outgoing light quantity to an incident light quantity as seen from the visible side.

In FIG. 1, when no voltage is applied to the liquid crystal element 20, upon linearly polarized light falling through the polarizing film 11 from the upper visible side, components of the linearly polarized light at all wavelengths in the visible light region is turned into circularly polarized light after passing through the second retardation film 14 and the first retardation film 13. Since the twisted retardation film 12 and the liquid crystal element 20 are fully compensated, the circularly polarized light undergoes no change in polarization state, and arrives at the reflector 7 as it is. The circularly polarized light reflected at the reflector 7 undergoes no change even after passing through the liquid crystal element 20 and the twisted retardation film 12, however, when passing through the first retardation film 13 and the second retardation film 14, the circularly polarized light reverts to linearly polarized light with the direction of polarization rotated through 90°, and the linearly polarized light is nearly all absorbed by the polarizing film 11, so that display in perfect black with low reflectance as indicated by the curve 34 in FIG. 12 can be obtained.

If only a sheet of quarter-wavelength film made of ordinary polycarbonate (PC) is used instead of the first retardation film 13 and the second retardation film 14, light components in the short wavelength range as well as the long wavelength range are leaked, and perfect black display can not be effected, thereby indicating purplish black display, and lowering contrast.

Next, when a predetermined voltage is applied between the first electrodes 3 and the second electrodes 4 inside the liquid crystal element 20, the liquid crystal molecules of the nematic liquid crystal 6 are caused to rise, and a real Δnd value of the liquid crystal element 20 decreases.

Consequently, the linearly polarized light falling through the polarizing film 11 from the visible side is turned into the circularly polarized light after passing through the second retardation film 14 and the first retardation film 13, but reverts to elliptically polarized light or linearly polarized light as a result of passing through the twisted retardation film 12 and the liquid crystal element 20.

When birefringence occurring to the liquid crystal element 20 is equalized with that of the quarter-wavelength film by applying the voltage, the linearly polarized light falling through the polarizing film 11 as shown in FIG. 1 is not rotated even when reflected by the reflector 7 and passing through the twisted retardation film 12 and the liquid crystal element 20, thus returning as it is. Accordingly, all components thereof are transmitted through the polarizing film 11, and are sent out to the visible side, so that display in bright and excellent white at a high reflectance as indicated by the curve 35 in FIG. 12 can be obtained.

Thus, with the use of the polarizing film 11, the second retardation film 14, the first retardation film 13, the twisted retardation film 12, and the liquid crystal element 20 incorporating the reflector 7, it becomes possible to obtain display in excellent black and display in bright white, thereby enabling bright display in high contrast to be effected.

VARIATIONS OF THE FIRST EMBODIMENT

With the first embodiment described in the foregoing, an STN liquid crystal element twisted by 240 degrees is used for the liquid crystal element 20, however, even with the use of a TN liquid crystal element having a twist angle of around 90 degrees, a similar reflection-type liquid crystal display device of single polarizing film type can be obtained.

In the case of effecting a large screen display by use of the TN liquid crystal element, it is preferable to adopt an active-matrix reflection-type liquid crystal display device incorporating active elements such as TFTs, MIMs, and so forth.

Further, with this embodiment, a liquid crystalline polymer film in a fixed twist state at room temperature is used for the twisted retardation film 12, however, use of a temperature-compensation type twisted retardation film which is made only by bonding portions of liquid crystal molecules with polymer molecules in chain form, and having varying $\Delta$nd values (=Rc) thereof depending on temperature will improve brightness and contrast at high or low temperatures, so that a better reflection-type liquid crystal display device can be obtained.

With this embodiment, the reflector 7 is formed separately from the first electrodes 3, however, the first electrode may be formed of a metal such as aluminum, silver, and so forth, to be reflective electrodes doubling as the reflector 7. In this way, the device can be simplified in construction (the specific example thereof will be described hereinafter).

Further, the first substrate 1 need not be transparent. In the case of the first substrate 1 being transparent, even if the reflector 7 is disposed on the outer side of the first substrate 1, the substantially same effects can be obtained in respect of brightness and contrast although shadows occur to display.

Furthermore, with this embodiment, polycarbonate (PC) is used for the first retardation film 13, and polypropylene (PP) for the second retardation film 14, respectively, however, use of other constituent material may be effective to some extent as long as wavelength-dependencies of the refractive index of the respective retardation films differ from each other.

For example, in the case of using polyallylate for the first retardation film 13, and polyvinylalcohol for the second retardation film 14, good contrast was obtained.

Still further, with this embodiment, the retardation value F1 of the first retardation film 13 was set at 0.36 $\mu$m, and the retardation value F2 of the second retardation film 14 at 0.50 $\mu$m, however, provided that the relationship expressed by the formula, $\Delta F = F2 - F1 = 0.14$ $\mu$m, is maintained, the same effect can be obtained even if the retardation values F1, F2 differ from the values described above by way of example.

SECOND EMBODIMENT

Figure 8:
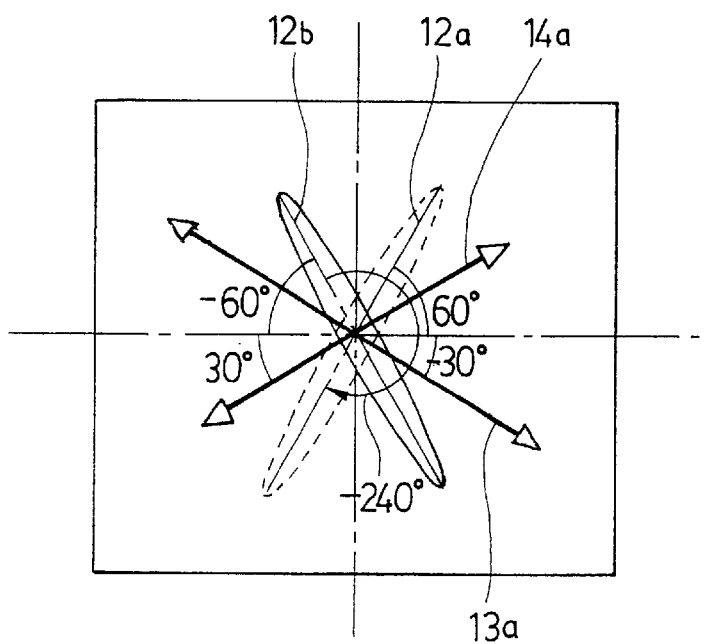
FIG. 8 is a schematic illustration showing a relationship among the direction of respective phase delay axes of first and second retardation films and a twist angle of a twisted retardation film of the liquid crystal display device.
Figure 6:
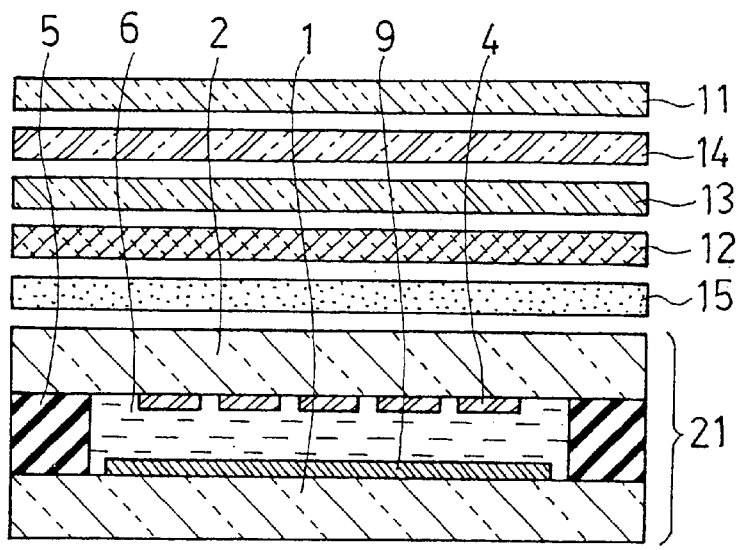
FIG. 6 is a schematic sectional view showing the constitution of a second embodiment of a liquid crystal display device according to the invention.
Figure 7:
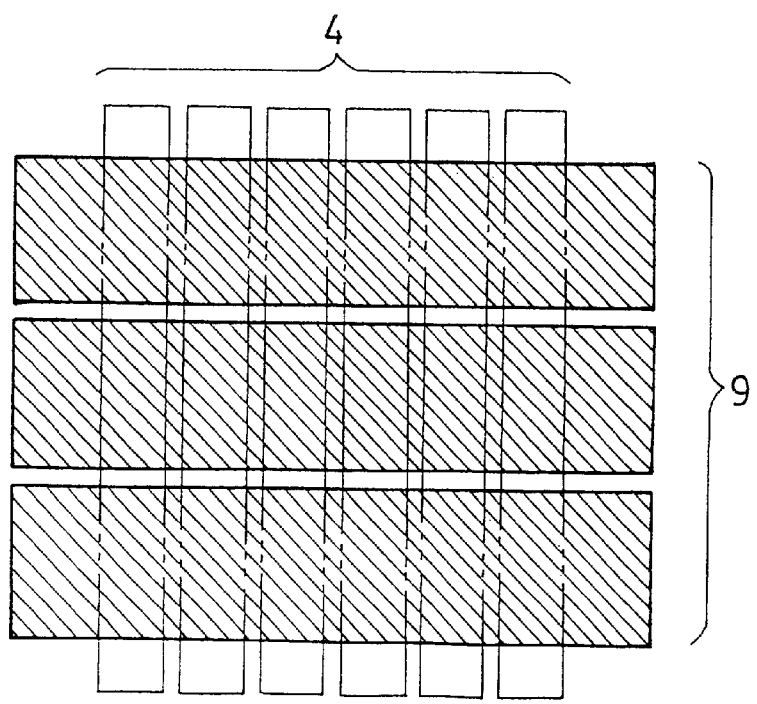
FIG. 7 is a plan view showing a planar layout relationship between reflective electrodes and second electrodes of the liquid crystal display device.

FIGS. 6 to 8

Now, a second embodiment of a liquid crystal display device according to the invention is described hereinafter with reference to FIGS. 6 to 8.

First, the configuration of the liquid crystal display device is described with reference to FIGS. 6 and 7. These figures are similar to FIGS. 1 and 2 for the first embodiment described above, and parts corresponding to those in FIGS. 1 and 2 are denoted by the like reference numerals. Description thereof is simplified or omitted.

The liquid crystal display device according to the second embodiment also constitutes a reflection-type liquid crystal display device of single polarizing film type, and differs from the constitution of the first embodiment of the invention only in respect of the type and installation angle of retardation films, installation of a diffusion film, use of reflective electrodes instead of the reflector.

A liquid crystal element 21 of the liquid crystal display device incorporates reflective electrodes 9 made of aluminum 0.2 $\mu$m thick, formed directly on the inner face of a first substrate 1 thereof, and differs from the liquid crystal element 20 according to the first embodiment in that the reflector 7 and the protective film 8, shown in FIG. 1, are not installed.

The reflective electrodes 9 have the surface thereof serving as a reflection face, and serve as the first electrodes 3 and the reflector 7, shown in FIGS. 1 and 2. As shown in FIG. 7, the reflective electrodes 9 are patterned in stripes running in the direction orthogonal to second electrodes 4 which are transparent and patterned in stripes, and spots where the reflective electrodes 9 and the second electrodes 4 cross and superpose each other constitute respective pixels.

As shown in FIG. 6, on the outer side of a second substrate 2 of the liquid crystal element 21, a diffusion film 15, a twisted retardation film 12, a first retardation film 13, a second retardation film 14, and a polarizing film 11 are disposed in sequence, and the polarizing film 11, the second retardation film 14, the first retardation film 13, and the twisted retardation film 12 are integrally bonded with each other with an acrylic adhesive.

The diffusion film 15 is installed to obtain bright display having a wide viewing angle by scattering light rays reflected by the reflective electrodes 9.

Incident light rays entering from outside preferably undergo forward scattering as much as possible with less backward scattering because high contrast can be obtained in this way. In this case, a light scattering type adhesive 30 $\mu$m thick, composed of fine particles mixed in an adhesive, is used for the diffusion film 15, and the light scattering type adhesive serves also as an adhesive for bonding of the diffusion film 15 with the second substrate 2 as well as the twisted retardation film 12.

The polarizing film 11 and the twisted retardation film 12 are the same as those used in the first embodiment.

The first retardation film 13 is a transparent film about 70 $\mu$m thick, formed by drawing polycarbonate (PC), and has a retardation value F1=0.14 $\mu$m, substantially equivalent to a quarter-wavelength at a wavelength of 0.55 $\mu$m.

The second retardation film 14 is also a transparent film about 70 $\mu$m thick, formed by drawing polycarbonate (PC), and has a retardation value F2=0.28 $\mu$m, substantially equivalent to a half-wavelength at a wavelength of 0.55 $\mu$m.

Hereinafter, a planar layout relationship of respective constituent members of the liquid crystal display device is described with reference to FIGS. 3 and 8.

An alignment film (not shown) is formed on the surface of the reflective electrodes 9 as well as the second electrodes 4 of the liquid crystal element 21, and as with the first embodiment shown in FIG. 3, a lower molecular alignment direction 6a of nematic liquid crystal 6, and an upper molecular alignment direction 6b of the nematic liquid crystal 6 points at +30° and −30° to the horizontal axis, respectively (an angle of counterclockwise rotation is expressed in plus, and an angle of clockwise rotation is expressed in minus).

The liquid crystal element 21 of STN mode, having a twist angle Ts of 240° counterclockwise, is made up by adding an optical rotatory substance called chiral to the nematic liquid crystal 6 having a viscosity at 20 cp, and adjusting a twist pitch P to 11 $\mu$m. A $\Delta$nd value Rs indicating the birefringent tendency of the liquid crystal element 21 is the same as that for the liquid crystal element 20, that is, 0.84 $\mu$m.

The polarizing film 11 is disposed such that a transmission axis thereof forms an angle of +45° on the basis of the horizontal axis as shown in FIG. 3.

As shown in FIG. 8, a lower molecular alignment direction 12a of the twisted retardation film 12 points at +60° on the basis of the horizontal axis, and an upper molecular alignment direction 12b of molecules in the upper part thereof points at −60° on the basis of the horizontal axis.

Accordingly, the twist direction of the twisted retardation film 12 is clockwise, and a twist angle Tc thereof becomes 240°. Assuming that a difference in absolute value between the twist angle of the twisted retardation film 12 and that of the liquid crystal element 21 is ΔT, ΔT=|Ts|−|Tc|=0°. Further, a Δnd value Rc indicating the birefringent tendency of the twisted retardation film 12 is 0.80 μm, and assuming that a difference with the Δnd value Rs of the liquid crystal element 21 is ΔR, ΔR=Rs−Rc=(0.84−0.80) μm=0.04 μm, thus showing that the Δnd values of both are substantially equivalent to each other.

Further, as shown in FIG. 8, the phase delay axis 13a of the first retardation film 13 is disposed at −30° on the basis of the horizontal axis while the phase delay axis 14a of the second retardation film 14 is disposed at +30° on the basis of the horizontal axis.

Herein advantageous effects of the liquid crystal display device according to the second embodiment is described, however, effects of the twisted retardation film 12 and the liquid crystal element 21 are the same as those in the case of the first embodiment, that is, the former acting to fully compensate birefringent tendency occurring to the liquid crystal element 21. Accordingly, the advantageous effect of the retardation films only will be described hereinafter.

With the first embodiment, two sheets of the retardation films each having a different wavelength dependency of the refractive index thereof are used, however, even by use of two sheets of the retardation films having the same wavelength dependency of the refractive index, it is possible to obtain a wide-band quarter-wavelength film capable of converting light in the visible light range into circularly polarized light.

With the first embodiment, the second retardation film 14 is superposed on the first retardation film 13 such that respective phase delay axes cross each other at right angles, however, with the liquid crystal display device according to the second embodiment, the second retardation film 14 is superposed on the first retardation film 13 such that an angle of 60° is formed between respective phase delay axes.

By superposing the second retardation film 14 having a retardation value F2=0.28 μm substantially equivalent to a half-wavelength on the first retardation film 13 having a retardation value F1=0.14 μm substantially equivalent to a quarter-wavelength such that an angle of 60° is formed between the respective phase delay axes, a total retardation value for both the retardation films becomes 0.14 μm at a wavelength of 0.55 μm, but is less than 0.14 μm at short wavelengths around 0.4 μm, and greater than 0.14 μm at long wavelengths around 0.7 μm, and the effective phase delay axis becomes in the horizontal direction.

More specifically, by use of two sheets of the retardation films, even if each of them is made of material having the same wavelength-dependency of refractive index, it becomes possible to form a so-called wide-band quarter-wavelength film wherein retardation values in a short wavelength region are smaller than those in a long wavelength region. That is, the quotients of retardation values divided by wavelengths, respectively, can be rendered approximately one quarter over the entire visible light region. Consequently, circularly polarized light can be obtained at all wavelengths in the visible light region, so that perfect black in display can be obtained.

In FIG. 6, upon linearly polarized light falling on the liquid crystal device through the polarizing film 11 from the upper visible side, components of the linearly polarized light at all wavelengths in the visible light region are turned into circularly polarized light after passing through the second retardation film 14 and the first retardation film 13.

When no voltage is applied between the reflective electrodes 9 and the second electrodes 4 of the liquid crystal element 21, the circularly polarized light undergoes no change in polarization state after transmitted therethrough because the twisted retardation film 12 and the liquid crystal element 21 are fully compensated. The diffusion film 15 hardly has any retardation value, and is made of material causing no change in polarization state. Consequently, the circularly polarized light arrives at the reflective electrodes 9 as it is.

The circularly polarized light reflected at the reflective electrodes 9 undergoes no change even after passing through the liquid crystal element 21 and the twisted retardation film 12, but when passing through the first retardation film 13 and the second retardation film 14, the circularly polarized light reverts to linearly polarized light with the direction of polarization rotated through 90°, and the linearly polarized light is nearly all absorbed by the polarizing film 11, so that perfect black display can be obtained.

The diffusion film 15 may be disposed anywhere up to the polarizing film 11 if on the outer side (the visible side) of the second substrate 2, or on the outer surface of the polarizing film 11, however, it is preferably disposed as close to the second substrate 2 as possible in order to reduce display blurring.

Further, since the second substrate 2 is preferably as thin as possible so as to reduce display blurring, thickness thereof is set at 0.5 μm in this embodiment.

When a predetermined voltage is applied between the reflective electrodes 9 and the second electrodes 4 of the liquid crystal element 21, the liquid crystal molecules of the nematic liquid crystal 6 are caused to rise, and a real Δnd value of the liquid crystal element 21 decreases. As a result, birefringent tendency occurring in the liquid crystal element 21 is equalized with that of the quarter-wavelength film.

Consequently, the linearly polarized light falling on the liquid crystal display device from the visible side through the polarizing film 11 is turned into the circularly polarized light after passing through the second retardation film 14 and the first retardation film 13, but reverts to elliptically polarized light or linearly polarized light as a result of passing through the twisted retardation film 12 and the liquid crystal element 21. The elliptically polarized light or linearly polarized light arrives at the reflective electrodes 9, and is reflected thereby. The elliptically polarized light or linearly polarized light as reflected returns without being rotated, and nearly all components thereof are transmitted through the polarizing film 11 to be sent out to the visible side, so that bright white display can be obtained.

Thus, by use of the polarizing film 11, the second retardation film 14, the first retardation film 13, the twisted retardation film 12, the diffusion film 15, and the liquid crystal element 21 incorporating the reflective electrodes 9, installed in this order from the visible side, it becomes possible to obtain excellent black display and bright white display, thereby enabling bright display in high contrast to be effected by use of the reflection-type liquid crystal display device of single polarizing film type.

VARIATIONS OF THE SECOND EMBODIMENT

With the liquid crystal display device according to the second embodiment, the twist direction of the twisted retardation film 12 is opposite to that of the liquid crystal element 21, both the twist angles are equal to each other, and both the Δnd values are substantially equal as well. However, the twist angle of the twisted retardation film 12 need only be nearly equal to that of the liquid crystal element 21, and the twist angle of the twisted retardation film 12 is preferably slightly greater than the latter. For example, as with the example of the first embodiment, shown in FIG. 5, when the twist angle of the twisted retardation film 12 was set at 245°, greater by 5° than the twist angle 240° of the liquid crystal element 21, optimum compensation could be provided.

With the second embodiment, the liquid crystal element 21 in which reflective electrodes 9 serving as the reflector and the first electrode is adopted, however, even if a liquid crystal display device is composed by combining the same liquid crystal element 20 as used in the first embodiment with the polarizing film 11, the second retardation film 14, the first retardation film 13, the twisted retardation film 12, and the diffusion film 15 according to the second embodiment, the same effect as that for this embodiment can be obtained.

Further, with this embodiment, for the first retardation film 13 and the second retardation film 14, use is made of a retardation film formed by uniaxial drawing of polycarbonate (PC) such that a relationship among refractive index nz in the direction of z axis, refractive index nx in the direction of drawing, and refractive index ny in the direction orthogonal thereto is expressed by the following formula: nx>ny=nz. However, the same effect can be obtained even with the use of a so-called Z type retardation film formed by multiaxial drawing of polycarbonate (PC) such that the relationship can be expressed by the formula: nx>nz>ny, or a retardation film formed by drawing material such as polyvinylalcohol (PVA), polypropylene (PP), and so forth.

In addition, it is possible to adopt variations similar to those for the first embodiment, such as use of a TN liquid crystal element for the liquid crystal element 21, improvement in brightness and contrast at high or low temperatures by use of a temperature-compensation type twisted retardation film for the twisted retardation film 12, no need of the first substrate 1 being transparent., and so forth.

THIRD EMBODIMENT

Figure 9:
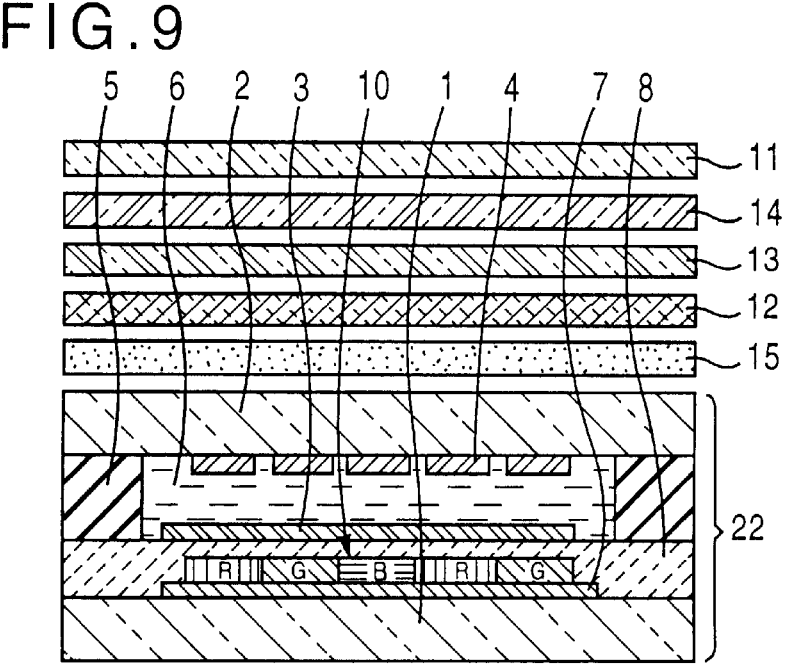
FIG. 9 is a schematic sectional view showing the constitution of a third embodiment of a liquid crystal display device according to the invention.
Figure 10:
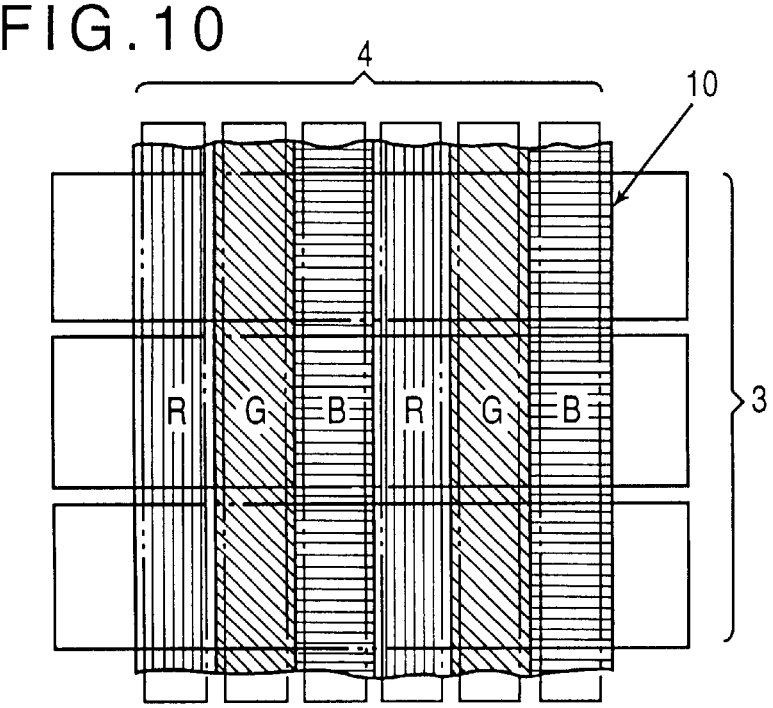
FIG. 10 is a plan view showing a planar layout relationship among color filters, first electrodes and second electrodes of the liquid crystal display device.

FIGS. 9 to 10

Now, a third embodiment of a liquid crystal display device according to the invention is described hereinafter with reference to FIGS. 9 and 10.

FIG. 9 is a schematic sectional view showing the constitution of the liquid crystal display device, and FIG. 10 is a plan view showing a planar layout relationship among color filters and first as well as second electrodes (shown by phantom lines) of a liquid crystal element. In the figures, parts corresponding to those in FIGS. 1, 6, and 2 are denoted by the like reference numerals.

The liquid crystal display device according to the third embodiment differs in constitution from the first and second embodiments in that the color filters are installed between a reflector 7 and the first electrodes 3 inside the liquid crystal element, thereby composing a reflection-type liquid crystal display device capable of effecting colored display.

With the liquid crystal display device, the liquid crystal element 22 is provided with the 1 μm thick color filters 10 on the reflector 7 made of 0.2 μm thick aluminum provided on the inner face of the first substrate 1 thereof. The color filters 10 are comprised of filters in three colors, red filters R, green filters G, and blue filters B, and are formed in alternate and parallel stripes so as to correspond to the second electrodes 4 patterned in stripes, formed on the inner face of the second substrate 2. The respective color filters R, G, B are formed to have a width wider than that of the respective second electrodes 4 so as not have a gap therebetween. It is not desirable that there exists a gap between the respective color filters 10 because this will cause white light to be mixed with display colors, and degrade color purity although a quantity of incident light is increased and display of images becomes brighter.

The constitution of the liquid crystal element 22, in other respects, is the same as that of the liquid crystal element 20 shown in FIG. 1, and description thereof is therefore omitted.

As with the case of the second embodiment shown in FIG. 6, on the outer side (the visible side) of the second substrate 2 of the liquid crystal element 22, a diffusion film 15, a twisted retardation film 12, a first retardation film 13, a second retardation film 14, and a polarizing film 11 are disposed in sequence. This embodiment is the same as the second embodiment in respect of the constitution of the respective films described above, joining of the respective films with each other by pasting with an adhesive, and use of the light scattering adhesive for the diffusion film 15.

Further, with this embodiment, a layout relationship between lower and upper molecular alignment directions 6a, 6b of nematic liquid crystal 6 of the liquid crystal element 22 and a transmission axis 11a of the polarizing film 11 is the same as that for the first embodiment shown in FIG. 3. Also, a layout relationship between lower and upper molecular alignment directions 12a, 12b of the twisted retardation film 12, and phase delay axes 13a, 14a of the first and second retardation films 13, 14, respectively, is the same as that for the second embodiment shown in FIG. 8. Accordingly, figures showing these and description thereof are omitted.

For improvement of brightness, the color filters 10 preferably have the maximum transmittance at an optical spectrum as high as possible, and the respective color filters preferably have the maximum transmittance of 80% or more, most preferably 90% or more. Further, the minimum transmittance thereof at an optical spectrum need be as high as 20 to 50%.

For the color filters 10, various types such as a pigment dispersion type, a dyeing type, a printing type, a transfer type, a electrodeposition type and so forth can be used, however, a color filter of the pigment dispersion type made by dispersing a pigment in an acrylic or PVA based photosensitive resin is most preferable because of heat resistance at high temperatures and high color purity.

For obtaining the color filters 10 having a high transmittance, the reflector 7 made up of a thin aluminum film was formed on the inner face of the first substrate 1, the surface of the reflector 7 was inactivated by anodizing, subsequently a color resist with 10 to 15% of a pigment blended with photosensitive resin was applied to the inner face of the first substrate 1 by use of a spinner, and a exposure and development treatment was applied thereto, whereupon the 1 μm thick color filters 10 having a high transmittance was obtained.

Herein, the effect of the liquid crystal display device according to the third embodiment is described. As described with reference to the first embodiment, when no voltage is applied between the first electrodes 3 and the second electrodes 4 of the liquid crystal element 22 (the liquid crystal element 20 in the case of the first embodiment), the twisted retardation film 12 and the liquid crystal element 22 are fully compensated, so that birefringent tendency does not occur at all.

The second retardation film 14 and the first retardation film 13 have a total retardation value of 0.14 μm at a wavelength of 0.55 μm, and form a so-called wide-band quarter-wavelength film wherein retardation values in a short wavelength region are smaller than those in a long wavelength region, so that the quotients of retardation values divided by wavelengths can be rendered approximately one quarter over the entire visible light region. Consequently, circularly polarized light can be obtained at all wavelengths in the visible light region, enabling perfect black in display to be effected as with the second embodiment.

In FIG. 9, upon linearly polarized light falling on the liquid crystal display device through the polarizing film 11 from the upper visible side, components of the linearly polarized light at all wavelengths in the visible light region are turned into circularly polarized light after passing through the second retardation film 14 and the first retardation film 13.

Since the twisted retardation film 12 and the liquid crystal element 22 are fully compensated while the first electrodes 3, a protective film 8 and the color filters 10 have no birefringent tendency at all, the circularly polarized light undergoes no change in polarization state, and arrives at the reflector 7 as it is.

The circularly polarized light reflected at the reflector 7 undergoes no change even after passing through the liquid crystal element 22 and the twisted retardation film 12, but when passing through the first retardation film 13 and the second retardation film 14, the circularly polarized light reverts to linearly polarized light with the direction of polarization, rotated through 90°, and the linearly polarized light is all absorbed by the polarizing film 11, so that perfect black display can be obtained.

When a predetermined voltage is applied between the first electrodes 3 and the second electrodes 4 of the liquid crystal element 22, liquid crystal molecules of the nematic liquid crystal 6 are caused to rise, and a real Δnd value of the liquid crystal element 22 decreases. Consequently, the linearly polarized light falling on the liquid crystal display device from the visible side through the polarizing film 11 is turned into circularly polarized light after passing through the second retardation film 14 and the first retardation film 13, but reverts to elliptically polarized light or linearly polarized light as a result of passing through the twisted retardation film 12 and the liquid crystal element 22. The elliptically polarized light or linearly polarized light arrives at the reflector 7, and is reflected thereby. The elliptically polarized light or linearly polarized light as reflected returns without being rotated, and nearly all components thereof are transmitted through the polarizing film 11 to be sent out to the visible side, so that bright white display can be obtained.

By combining a display pixel in the on (white) state with a display pixel in the off (black) state, color display can be effected. For example, red display can be effected by turning a pixel provided with a red filter R "on" (white) and turning pixels provided with a green filter G and a blue filter B, respectively, "off" (black)

With the reflection-type liquid crystal display device according to this embodiment, it was possible to achieve a high reflectance, and a contrast ratio as high as 10 or more, and bright color display having high chroma could be effected.

Thus, by use of the polarizing film 11, the second retardation film 14, the first retardation film 13, the twisted retardation film 12, the diffusion film 15, and the liquid crystal element 22 incorporating the reflector 7 and the color filters 10, installed in this order from the visible side, it becomes possible to obtain display in excellent black and display in bright white, thereby enabling bright display in high contrast to be effected by use of the reflection-type liquid crystal display device of single polarizing film type.

VARIATIONS OF THE THIRD EMBODIMENT

With the third embodiment, an STN liquid crystal element twisted through 240 degrees is used for the liquid crystal element 22, however, even with the use of a TN liquid crystal element having a twist angle of around 90 degrees, a similar reflection-type liquid crystal display device can be obtained.

In the case of effecting display on a large screen by use of the TN liquid crystal element, it is preferable to adopt a liquid crystal display device of an active-matrix mode incorporating active elements such as TFTs, MIMs, and so forth.

With this embodiment, the reflector 7 is formed on the underside of the first electrodes 3 such that the protective film 8 is sandwiched therebetween, however, the first electrodes 3 may be made up of a metal film made of aluminum, silver, and so forth, to be reflective electrodes doubling as the reflector 7. And the color filters 10 may be formed directly on the reflective electrodes.

Further, with this embodiment, the color filters 10 are installed on the side of the first substrate 1, but it may be installed between the second substrate 2 and the second electrodes 4 provided on the side of the second substrate 2, instead.

However, in the case where the color filters 10 are installed on the side of the first substrate 1, the protective film 8 can serve for planarization of the color filters 10, doubling as an insulation film between the reflector 7 and the first electrodes 3.

Furthermore, with this embodiment, for the color filters 10, the filters in three colors of red, green and blue are used, however, with the use of color filters in three colors of cyan, yellow and magenta, similar bright color display can be effected as well.

Still further, with this embodiment, material having the same wavelength dependency of refractive index is used for the first retardation film 13 as well as the second retardation film 14, and both the retardation films are disposed such that the respective phase delay axes cross each other at 60°, however, as with the first embodiment, two sheets of the retardation films having different wavelength-dependency of reflective index may be used if disposed such that the respective phase delay axes cross each other at right angles.

FOURTH EMBODIMENT

FIGS. 13 to 17

Now, a fourth embodiment of a liquid crystal display device according to the invention is described hereinafter with reference to FIGS. 13 to 17. With respective embodiments described hereinafter, a transflective liquid crystal display device of single polarizing film type is implemented according to the invention.

First, the constitution of the liquid crystal display device according to the fourth embodiment is described hereinafter with reference to FIGS. 13 and 14. In these figures, parts corresponding to those previously described in FIGS. 1 and 2 are denoted by the like reference numerals, and description thereof is simplified or omitted.

Figure 13:
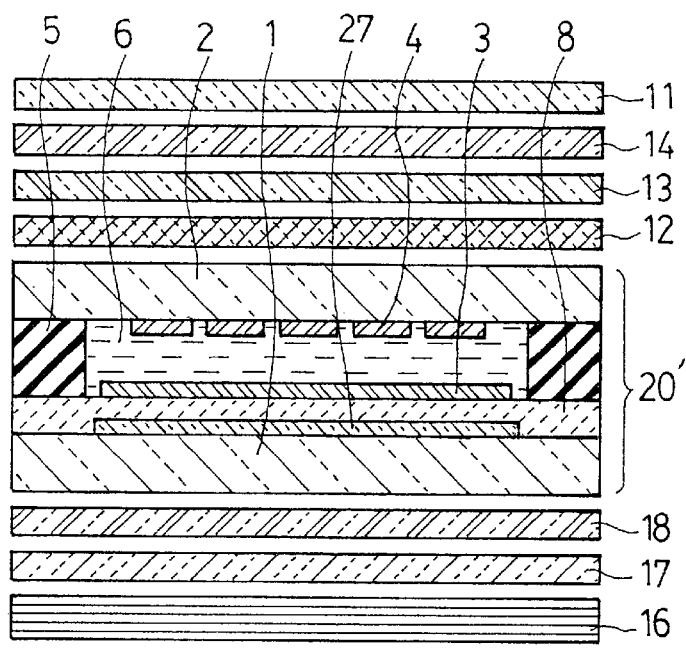
FIG. 13 is a schematic sectional view showing the constitution of a fourth embodiment of a liquid crystal display device according to the invention.

As shown in FIG. 13, the liquid crystal display device comprises a liquid crystal element 20', and a twisted retardation film 12, a first retardation film 13, a second retardation film 14, and a first polarizing film 11 that are disposed in sequence on the outer side (the visible side) of a second substrate 2 of the liquid crystal element 20', and a third retardation film 18, a second polarizing film 17 and a backlight 16 that are disposed in sequence on the outer side (the side opposite from the visible side) of a first substrate 1 of the liquid crystal element 20'.

The liquid crystal element 20' is substantially the same in constitution as the liquid crystal element 20 according to the first embodiment as shown in FIG. 1 except that, in place of the reflector 7 of the liquid crystal element 20 in FIG. 1, a transflective reflector 27 is installed on the inner face of the first substrate 1. The transflective reflector 27 is composed of an aluminum film 0.02 μm thick.

As the aluminum film is rendered very thin in thickness, the transflective reflector 27 allows a portion of incident light to pass therethrough, but reflects the rest, thus serving as a so-called half-mirror.

With this embodiment, since the thickness of the aluminum film is set at 0.02 μm, about 10 to 20% of the incident light is transmitted while remaining 80 to 90% thereof is reflected, and the transflective reflector 27 is formed in a square shape so as to be common to an entire display region including all of respective pixels where first electrodes 3 and second electrodes 4 (as shown by phantom lines in FIG. 14) cross, and overlap each other.

The twisted retardation film 12, the first retardation film 13, the second retardation film 14, and the first polarizing film 11 are the same as those used in the first embodiment, shown in FIG. 1, and are integrally joined with each other by use of an acrylic adhesive. These films are also pasted to the liquid crystal element 20' with an acrylic adhesive. The first polarizing film 11 is the same as the polarizing film 11 in FIG. 1, however, in order to distinguish it from the second polarizing film 17, it is referred to as the first polarizing film 11 from this embodiment and onwards.

The third retardation film 18 is a film about 70 μm in thickness, formed by drawing polycarbonate (PC), and has a retardation value F3 of 0.14 μm at a wavelength of 0.55 μm, serving as a quarter-wavelength film.

As it is important that the second polarizing film 17 has a high degree of polarization, a polarizing film having a transmittance of 44% and a degree of polarization of 99.99% is adopted for the second polarizing film 17.

For the backlight 16, a light guide plate provided with a fluorescent light or an LED, or an electroluminesecnt (EL) film may be used. With this embodiment, an EL film about 1 mm thick emitting white light is used for the backlight 16.

A planar layout relationship among respective constituent members of the liquid crystal display device is described with reference to FIGS. 15 and 16.

Figure 15:
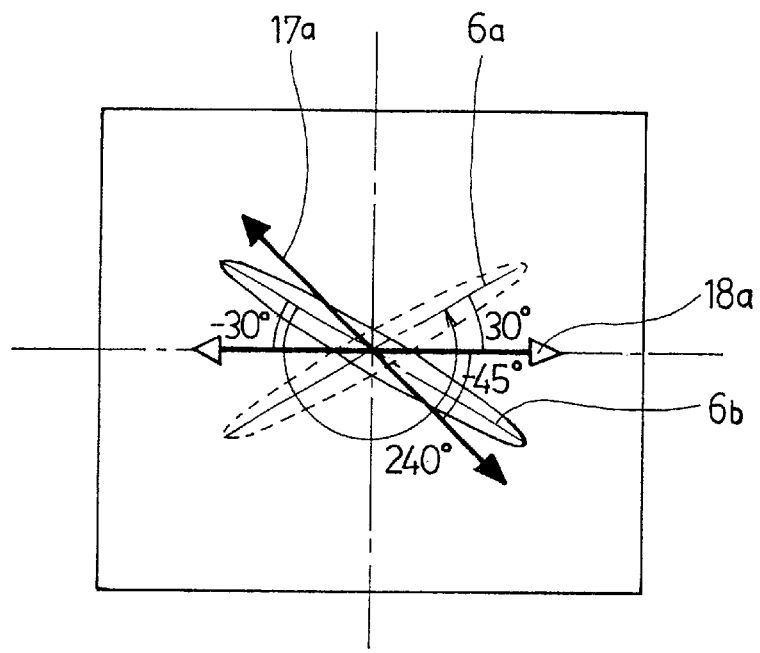
FIG. 15 is a schematic illustration showing a relationship among the direction of a transmission axis of a second polarizing film, a phase delay axis of a third retardation film, and a twist angle of nematic liquid crystal of a liquid crystal element of the liquid crystal display device.

On the surface of the first electrodes 3 and the second electrodes 4, an alignment film (not shown) is formed, and as shown in FIG. 15, a lower molecular alignment direction 6a of nematic liquid crystal 6 points at +30° by applying a rubbing treatment on the side of the first substrate 1 in the direction extending upward to the right at 30° to the horizontal axis while an upper molecular alignment direction 6b of the nematic liquid crystal 6 points at −30° by applying a rubbing treatment on the side of the second substrate 2 in the direction extending downward to the right at 30° to the horizontal axis.

The liquid crystal element 20' of STN mode, having a twist angle Ts of 240° counterclockwise, is made up by adding an optical rotatory substance called chiral to the nematic liquid crystal 6 having a viscosity at 20 cp, and adjusting a twist pitch P to 11 μm.

A birefringence difference Δn of the nematic liquid crystal 6 to be used is set at 0.15, and clearance between the first substrate 1 and the second substrate 2, that is, a cell gap d is set at 5.6 μm. Accordingly, a Δnd value Rs indicating a birefringent tendency of the liquid crystal element 20' as expressed by the product of the birefringence difference Δn of the nematic liquid crystal 6 and the cell gap d becomes 0.84 μm.

Figure 16:
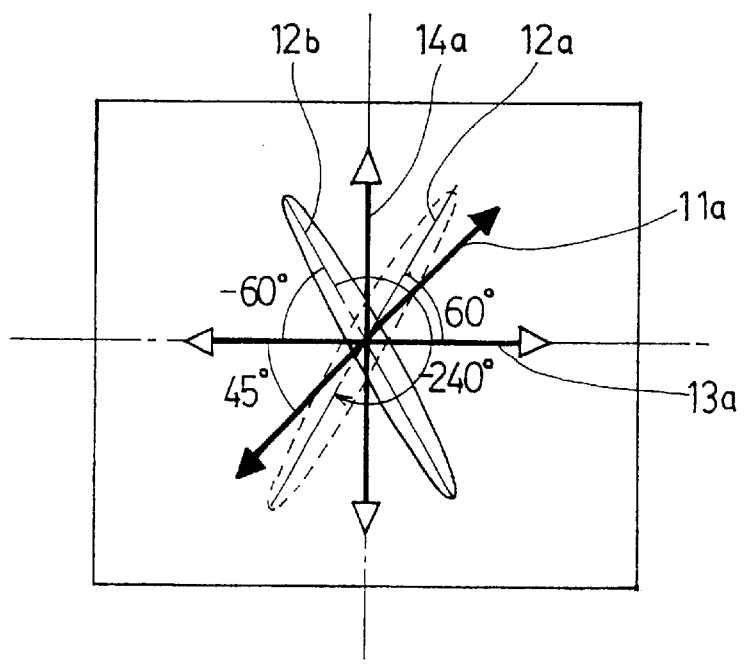
FIG. 16 is a schematic illustration showing a relationship among the direction of a transmission axis of a first polarizing film, the direction of respective phase delay axes of first and second retardation films, and a twist angle of a twisted retardation film of the liquid crystal display device.

The first polarizing film 11 is disposed such that a transmission axis 11a thereof forms an angle of +45° on the basis of the horizontal axis, as shown in FIG. 16.

A lower molecular alignment direction 12a of the twisted retardation film 12 is +60° on the basis of the horizontal axis, and an upper molecular alignment direction 12b thereof is −60° on the basis of the horizontal axis. Accordingly, the twist direction of the twisted retardation film 12 is clockwise, and a twist angle Tc thereof is 240°.

Assuming that a difference in absolute value between the twist angle of the liquid crystal element 20' and that of the twisted retardation film 12 is ΔT, ΔT=|Ts|−|Tc|=0°, and assuming that a difference in birefringent tendency between both the films is ΔR, ΔR=Rs−Rc=0.04 μm, indicating that both the films have substantially an equal birefringent tendency.

As shown in FIG. 16, the first retardation film 13 is disposed such that a phase delay axis 13a thereof is oriented horizontally, and the second retardation film 14 is disposed such that a phase delay axis 14a thereof is oriented vertically, so that the phase delay axis 13a and the phase delay axis 14a cross each other at right angles.

Accordingly, a retardation value F1 of the first retardation film 13, and a retardation value F2 of the second retardation film 14 are subjected to subtraction with the result that ΔF=F2−F1=0.14 μm where ΔF is an effective retardation value.

As shown in FIG. 15, the third retardation film 18 is disposed on the underside of the liquid crystal element 20' such that a phase delay axis thereof is oriented horizontally, and the second polarizing film 17 is disposed such that a transmission axis 17a thereof is oriented at −45° relative to the horizontal axis, thereby crossing the transmission axis 11a of the first polarizing film 11 shown in FIG. 16 at right angles.

Next, the effect of the liquid crystal display device according to the fourth embodiment is described. First, a case of reflective display will be described, which is the same as for the first embodiment.

The twist angle Tc and the Δnd value Rc of the twisted retardation film 12 are set to be substantially equivalent to the twist angle Ts and the Δnd value Rs of the liquid crystal element 20', respectively, and further, as shown in FIG. 16, by disposing the twisted retardation film 12 such that the lower and upper molecular alignment directions 12a, 12b thereof in such a way as to be orthogonal to the upper and lower molecular alignment directions 6b, 6a of the nematic liquid crystal 6, shown FIG. 15, respectively, birefringent tendency that will occur in the liquid crystal element 20' will be fully compensated, thus preventing occurrence of birefringence.

In practice, since a tilt angle indicating an inclination of the nematic liquid crystal 6 inside the liquid crystal element 20' is greater than a tilt angle of the twisted retardation film 12, it is preferable to set the Rc to a value slightly smaller than the Rs from the viewpoint of fully compensating the birefringent tendency.

It is more preferable to match wavelength dependency of the refractive index of the nematic liquid crystal 6 with wavelength dependency of the refractive index of liquid crystal polymer molecules of the twisted retardation film 12.

Even if the twist angle Tc of the twisted retardation film 12 differs from the twist angle Ts of the liquid crystal element 20', this allows the compensation to be effected to some extent provided that the former is substantially equal to the latter.

The results of experiments conducted by the inventors show that the compensation was effected when the twist angle Tc of the twisted retardation film 12 was within a range of the twist angle Ts (of the liquid crystal element 20') ±20°, but the compensation was well effected when Tc is equal to Ts.

Figure 17:
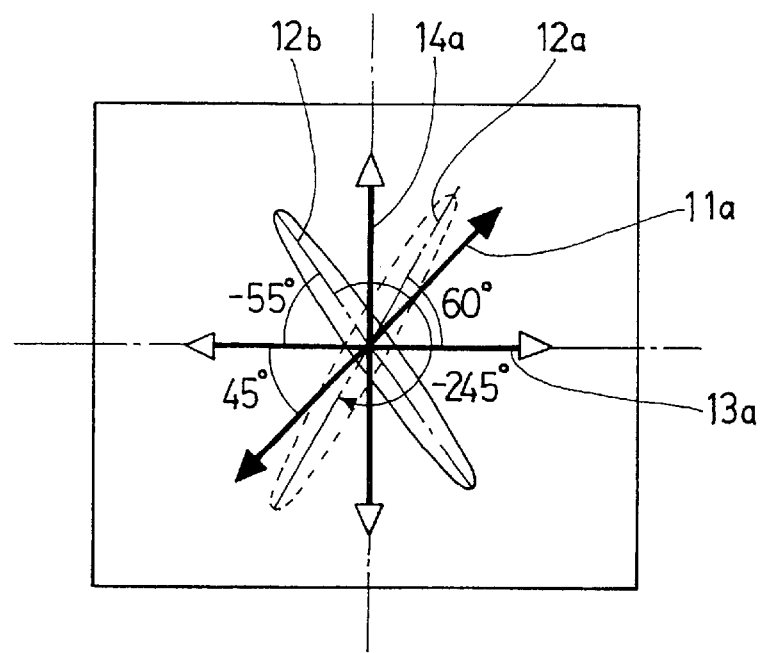
FIG. 17 is a schematic illustration similar to FIG. 16, showing a more preferable example.

Also, as shown in FIG. 17, in the case where the twist angle Tc of the twisted retardation film 12 was set to −245°, greater by 5° in absolute value than the twist angle Ts (240°) of the liquid crystal element 20'. In this case, the best compensation was effected.

Further, if a placement angle of the twisted retardation film 12 was in a range of 90°±20° relative to the liquid crystal molecules, it was found possible to compensate the birefringent tendency of the liquid crystal element.

When the second retardation film 14 is disposed to superpose on the first retardation film 13 such that respective phase delay axes 14a, 13a cross each other at right angles as shown in FIG. 16, the effect is the same as that for the first embodiment described with reference to FIGS. 11 and 12.

More specifically, by use of two sheets of the retardation films each having a different wavelength-dependency of refractive index, it becomes possible to form a so-called wide-band quarter-wave film wherein retardation values in a short wavelength region are smaller than those in a long wavelength region.

That is, the quotients F/λ, retardation values F divided by wavelengths λ can be rendered approximately one quarter over the entire visible light region. Consequently, circularly polarized light can be obtained in all wavelength regions, so that perfect black display can be obtained.

In FIG. 13, upon linearly polarized light falling on the liquid crystal display device from the upper visible side through the first polarizing film 11, components of the linearly polarized light at all wavelengths in the visible light region is turned into circularly polarized light after passing through the second retardation film 14 and the first retardation film 13. Since the twisted retardation film 12 and the liquid crystal element 20' are fully compensated when no voltage is applied to the liquid crystal element 20', the circularly polarized light undergoes no change in polarization state, and arrives at the transflective reflector 27 as it is.

The circularly polarized light reflected at the transflective reflector 27 undergoes no change even after passing through the liquid crystal element 20' and the twisted retardation film 12, however, when passing through the first retardation film 13 and the second retardation film 14, the circularly polarized light reverts to linearly polarized light with the direction of polarization being rotated through 90°, and the linearly polarized light is all absorbed by the first polarizing film 11, so that perfect black display as indicated by the curve 34 in FIG. 12 can be obtained.

When a predetermined voltage is applied between the first electrodes 3 and the second electrodes 4 inside the liquid crystal element 20', the liquid crystal molecules of the nematic liquid crystal 6 are caused to rise, and a real Δnd value of the liquid crystal element 20' decreases. Consequently, the linearly polarized light falling through the first polarizing film 11 from the visible side is turned into circularly polarized light after passing through the second retardation film 14 and the first retardation film 13, but reverts to elliptically polarized light or linearly polarized light as a result of passing through the twisted retardation film 12 and the liquid crystal element 20', arriving at the transflective reflector 27 to be reflected.

The elliptically polarized light or linearly polarized light as reflected returns without the direction of polarization being rotated, and nearly all components thereof outgo to the visible side after passing through the first polarizing film 11.

That is, when birefringence occurring in the liquid crystal element 20' is substantially equalized with that of a quarter-wavelength film by applying a voltage to the liquid crystal element 20', the linearly polarized light falling through the first polarizing film 11 is reflected by the transflective reflector 27, and returns as it is without the direction of polarization being rotated. Accordingly, almost all components thereof are transmitted through the first polarizing film 11, and are sent out to the visible side, so that bright and white display with a high reflectance as indicated by the curve 35 in FIG. 12 can be obtained.

Next, transmissive display effected when the backlight 16 shown in FIG. 13 is lit up is described hereinafter.

Light emitted from the backlight 16 is turned into linearly polarized light after passing through the second polarizing film 17. The linearly polarized light falls on the third retardation film 18 at an angle of 45° relative to the phase delay axis 18a thereof, and is turned into circularly polarized light. Thereafter, about 80% of the circularly polarized light is reflected by the transflective reflector 27, but remaining 20% thereof is transmitted therethrough.

In a state where no voltage is applied to the liquid crystal element 20', the twisted retardation film 12 and the liquid crystal element 20' are fully compensated, and consequently, the circularly polarized light undergoes no change in polarization state, arriving at the first retardation film 13 and the second retardation film 14 as it is.

Then, a retardation occurring at the third retardation film 18, and a retardation occurring at the first retardation film 13 and the second retardation film 14, disposed on the upper side of the liquid crystal element 20', respectively, are subjected to subtraction, and becomes zero, whereupon the circularly polarized light is turned into linearly polarized light with the direction of polarization, identical to the transmission axis 17a of the second polarizing film 17, and the linearly polarized light arrives at the first polarizing film 11.

Since the transmission axis 11a of the first polarizing film 11 crosses the transmission axis 17a of the second polarizing film 17 at right angles, the linearly polarized light is absorbed by the first polarizing film 11, and is not sent out to the visible side, thereby effecting excellent black display.

When a predetermined voltage is applied between the first electrodes 3 and the second electrodes 4 inside the liquid crystal element 20', the liquid crystal molecules of the nematic liquid crystal 6 are caused to rise, and a real Δnd value of the liquid crystal element 20' decreases. Consequently, the linearly polarized light entering through the second polarizing film 17 from the backlight 16 is turned into circularly polarized light after passing through the third retardation film 18 and, but it is further turned into elliptically polarized light or linearly polarized light as a result of passing through the twisted retardation film 12 and the liquid crystal element 20'.

When a retardation occurring to the liquid crystal element 20' is rendered equal to a quarter-wavelength by applying the voltage to the liquid crystal element 20', the linearly polarized light entering through the second polarizing film 17 has the direction of polarization rotated by 90° after passing through the first retardation film 13 and the second retardation film 14, thereby passing through the first polarizing film 11 to be sent out to the visible side. Accordingly, bright and white display can be effected.

Thus, by the agency of the first polarizing film 11, the second retardation film 14, the first retardation film 13, and the twisted retardation film 12 that are disposed in sequence from the visible side, and the liquid crystal element 20' incorporating transflective reflector 27, excellent black display and bright white display can be effected at the time of reflective display using external light while as a result of installing the third retardation film 18, the second polarizing film 17, and the backlight 16 that are disposed in sequence on the side of the liquid crystal element 20' opposite from the visible side, display in high contrast can be effected by lighting up the backlight 16 in an environment where there is little external light.

VARIATIONS OF THE FOURTH EMBODIMENT

With the fourth embodiment, an STN liquid crystal element twisted through 240 degrees is used for the liquid crystal element 20', however, even with the use of a TN liquid crystal element having a twist angle of around 90 degrees, a similar transflective liquid crystal display device can be obtained.

In the case of effecting display on a large screen by use of the TN liquid crystal element, it is preferable to adopt a active-matrix transflective liquid crystal display device, incorporating active elements such as thin film transistors (TFTs), thin film diodes of metal-insulator-metal (MIM), and so forth.

With the fourth embodiment, a liquid crystalline polymer film in a fixed twist state at room temperature is used for the twisted retardation film 12, however, use of a temperature-compensation type twisted retardation film made only by bonding portions of liquid crystal molecules with polymer molecules in chain form and having Rc thereof varying depending on temperature, will improve brightness and contrast at high or low temperatures, so that a better liquid crystal display device can be obtained.

With this embodiment, the transflective reflector 27 is composed of a thin aluminum film 0.02 $\mu$m thick, however, the same composed of a thin aluminum film with thickness in a range of 0.01 to 0.03 $\mu$m may serve as a half mirror allowing a portion of light rays to pass therethrough.

Further, the transflective reflector 27 having pits and projections at a pitch ranging from several to several tens am, formed on the surface thereof, is more preferable because reflected light is caused to scatter, thereby improving visibility.

For the transflective reflector 27, use may be made of not only the thin aluminum film but also a thin film made of aluminum alloy or silver. Further, a multilayer film composed of an aluminum film and an inorganic oxide film may be used for improving surface reflectance and protecting the surface.

Furthermore, with this embodiment, the transflective reflector 27 is formed aside from the first electrodes 3, however, the first electrodes composed of a thin metal film made of aluminum, silver, or so forth may double as the transflective reflector 27, thereby simplifying the construction of the device.

Further, even if the transflective reflector 27 is disposed on the outer side of the first substrate 1, similar effects can be obtained although shadows occur to display.

Still further, with this embodiment, polycarbonate (PC) is used for the first retardation film 13, and polypropylene (PP) for the second retardation film 14, however, advantageous effects to a degree can be obtained even if other constituent materials are used as long as the respective constituent materials have different wavelength-dependency of refractive index.

For example, in the case where polyallylate was used for the first retardation film 13, and polyvinylalcohol for the second retardation film 14, good contrast was obtained.

Furthermore, with this embodiment, the first retardation film 13 having the retardation value F1 at 0.36 $\mu$m and the second retardation film 14 having the retardation value F2 at 0.50 $\mu$m were employed, however, provided that the relationship expressed by the formula, $\Delta F = F2 - F1 = 0.14$ $\mu$m, is maintained, the same effect can be obtained even if the retardation values F1, F2 differ from the values described above.

FIFTH EMBODIMENT

Figure 14:
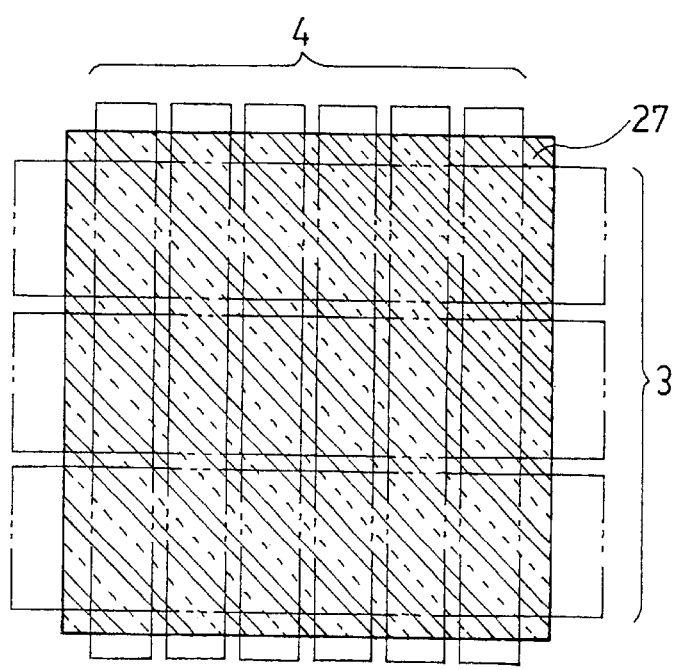
FIG. 14 is a plan view showing a planar layout relationship among a transflective reflector, first electrodes and second electrodes of the liquid crystal display device.
Figure 18:
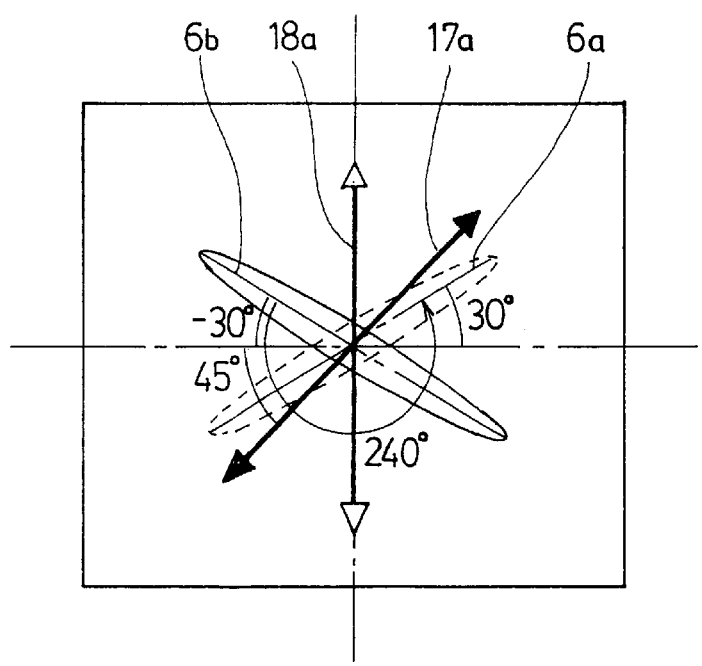
FIG. 18 is a schematic illustration showing a relationship among the direction of a transmission axis of a second polarizing film, the direction of a phase delay axis of a third retardation film, and a twist angle of nematic liquid crystal of a liquid crystal element, with reference to a fifth embodiment of a liquid crystal display device according to the invention.

FIGS. 13, 14, and 18

Now, a fifth embodiment of a liquid crystal display device according to the invention is described hereinafter.

The liquid crystal display device according to the fifth embodiment is substantially the same as the transflective liquid crystal display device according to the fourth embodiment, shown in FIGS. 13 and 14., and differs from the latter only in respect of a placement angle of a third retardation film 18 as well as a second polarizing film 17.

Accordingly, only the difference are described with reference to FIG. 18. In the figures, parts corresponding to those shown in FIGS. 13 and 14 are denoted by the like reference numerals.

The third retardation film 18 is disposed on the side of a liquid crystal element 20' opposite from the visible side such that the phase delay axis 18a thereof is oriented vertically while a second polarizing film 17 is disposed such that the transmission axis 17a thereof is oriented in the downward direction to the left at 45° relative to the horizontal axis so as to be in parallel with the transmission axis 11a (in FIG. 16) of a first polarizing film 11.

In the case of reflective display, operation of the liquid crystal display device according to the fifth embodiment is the same as that for the previously-described fourth embodiment, and display in good contrast can be effected by use of a twisted retardation film 12, a first retardation film 13, and a second retardation film 14.

Transmissive display effected when a backlight 16 is lit up is described hereinafter. Light emitted from the backlight 16 is turned into linearly polarized light after passing through the second polarizing film 17.

The linearly polarized light falls on the third retardation film 18 at an angle of 45° relative to the phase delay axis 18a thereof, and is turned into circularly polarized light. Thereafter, about 80% of the circularly polarized light is reflected by a transflective reflector 27 of the liquid crystal element 20', but remaining 20% thereof is transmitted therethrough.

In a state where no voltage is applied to the liquid crystal element 20', the twisted retardation film 12 and the liquid crystal element 20' are fully compensated, and consequently, the circularly polarized light undergoes no change in polarization state, arriving at the first retardation film 13 and the second retardation film 14 as it is.

With the fifth embodiment, as the third retardation film 18 is disposed so as to be shifted by 90° from that in the case of the fourth embodiment, a retardation occurring to the third retardation film 18, and a retardation occurring to the first retardation film 13 and the second retardation film 14 disposed on the visible side of the liquid crystal element 20', respectively, are added up, and the sum becomes a half-wavelength, whereupon the circularly polarized light passing therethrough is turned into linearly polarized light with the direction of polarization rotated through 90° relative to the transmission axis 17a of the second polarizing film 17.

Since the transmission axis 11a of the first polarizing film 11 is in parallel with the transmission axis 17a of the second polarizing film 17, the linearly polarized light falling on the first polarizing film 11 does not pass therethrough, but is absorbed by the first polarizing film 11, thereby effecting excellent black display.

When a predetermined voltage is applied between a first electrodes 3 and a second electrodes 4 inside the liquid crystal element 20', liquid crystal molecules of a nematic liquid crystals 6 are caused to rise, and a real Δnd value of the liquid crystal element 20' decreases. Consequently, the linearly polarized light entering through the second polarizing film 17 is turned into circularly polarized light after passing through the third retardation film 18, but is further turned into elliptically polarized light or linearly polarized light as a result of passing through the twisted retardation film 12 and the liquid crystal element 20'.

When a retardation occurring in the liquid crystal element 20' is rendered equal to a quarter-wavelength by applying the voltage to the liquid crystal element 20', the linearly polarized light entering through the second polarizing film 17 has the direction of polarization unrotated through 90° even after further passing through the first retardation film 13 and the second retardation film 14, and falls on the first polarizing film 11, thereby passing through the first polarizing film 11 to be sent out to the visible side. Accordingly, bright and white display can be effected.

Thus, by the agency of the first polarizing film 11, the second retardation film 14, the first retardation film 13, and the twisted retardation film 12 that are disposed in sequence from the visible side, and the liquid crystal element 20' incorporating a transflective reflector 27, excellent black display and bright white display can be effected at the time of reflective display using external light while as a result of installing the third retardation film 18, the second polarizing film 17, and the backlight 16 that are disposed in sequence on the side of the liquid crystal element 20' opposite from the visible side, display in high contrast can be effected by lighting up the backlight 16 in an environment where there is little external light.

SIXTH EMBODIMENT

FIGS. 19 to 22

A sixth embodiment of a liquid crystal display device according to the invention is described hereinafter with reference to FIGS. 19 to 22.

The liquid crystal display device according to the sixth embodiment differs from the liquid crystal display device according to the fourth embodiment only in respect of the type and placement angle of a first retardation film and a second retardation film, the shape of a transflective reflector, and addition of a diffusion film and a fourth retardation film.

The constitution of the liquid crystal display device according to the sixth embodiment is described hereinafter with reference to FIGS. 19 and 20. These figures correspond to FIGS. 13 and 14 for the fourth embodiment, and parts corresponding to those described with reference to FIGS. 13 and 14 are denoted by the like reference numerals, and description thereof is simplified or omitted.

Figure 19:
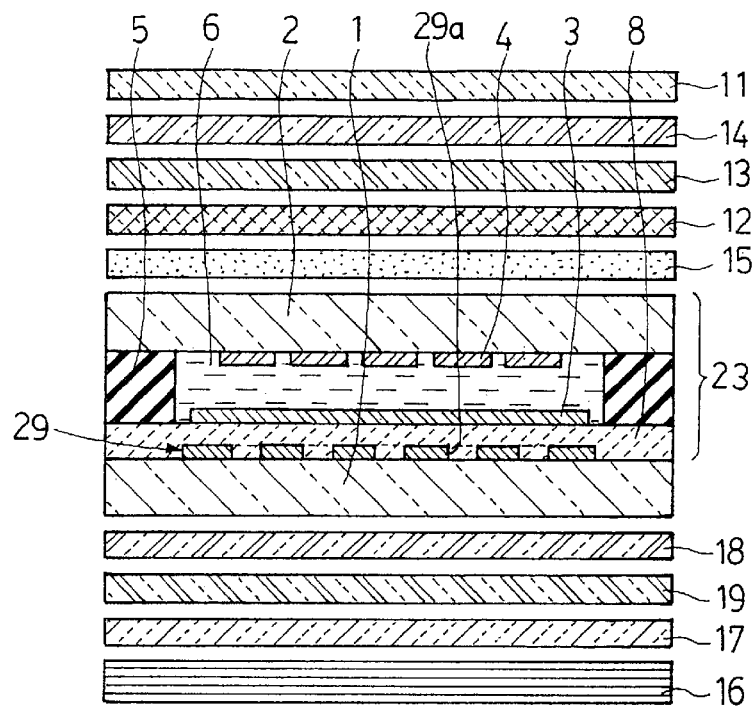
FIG. 19 is a schematic sectional view showing the constitution of a sixth embodiment of a liquid crystal display device according to the invention.

As shown in FIG. 19, the liquid crystal display device comprises a liquid crystal element 23, and a diffusion film 15, a twisted retardation film 12, a first retardation film 13, a second retardation film 14 and a first polarizing film 11 that are disposed in sequence on the outer side (the visible side) of a second substrate 2 of the liquid crystal element 23, and a third retardation film 18, a fourth retardation film 19, a second polarizing film 17 and a backlight 16 that are disposed in sequence on the outer side (the side opposite from the visible side) of a first substrate 1 of the liquid crystal element 23, thereby constituting a transflective liquid crystal display device.

The polarizing film 11, the second retardation film 14, the first retardation film 13, and the twisted retardation film 12 are integrally joined with each other by use of an acrylic adhesive.

The third retardation film 18, the fourth retardation film 19, and the second polarizing film 17 are also integrally joined with each other by use of an acrylic adhesive, and are bonded to the liquid crystal element 23 with an acrylic adhesive.

The liquid crystal element 23 is comprised of: a first substrate 1 composed of a glass sheet 0.5 mm thick, provided with a transflective reflector 29 composed of an aluminum film 0.1 μm thick, a protective film 8 made of an acrylic material 2 μm thick, and a first electrodes 3 made of ITO 0.3 μm thick that are formed thereon; a second substrate 2 composed of a glass sheet 0.5 mm thick, provided with a second electrodes 4 made of ITO 0.05 μm thick formed thereon; a sealant 5 bonding the first substrate 1 with the second substrate 2; and nematic liquid crystal 6 aligned so as to be twisted by 240 degrees counterclockwise, sandwiched between the first substrate 1 and the second substrate 2.

Figure 20:
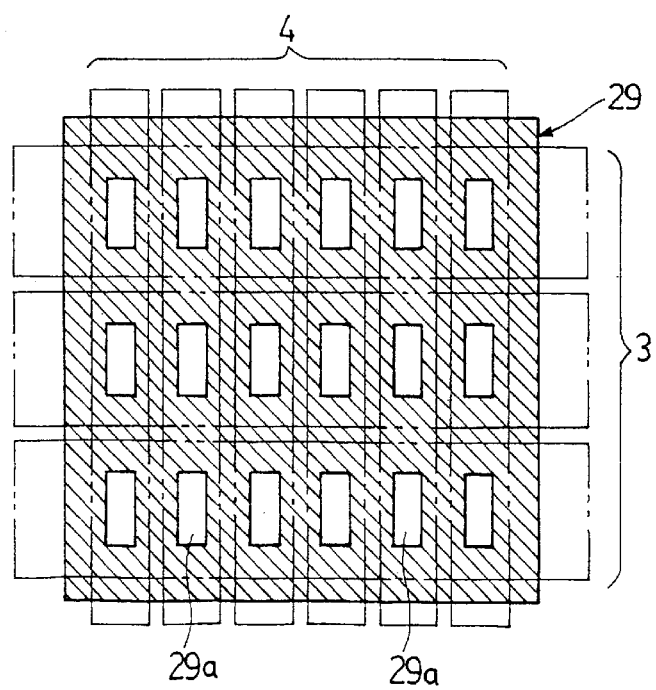
FIG. 20 is a plan view showing a planar layout relationship among a transflective reflector, first electrodes and second electrodes of the liquid crystal display device.

As shown in FIG. 20, the first electrodes 3 and the second electrodes 4 are patterned in stripes running in the direction orthogonal to each other, and spots where the first electrodes and the second electrodes horizontally cross and overlap each other, respectively, constitute respective pixels. The transflective reflector 29 is provided so as to be common to an entire display region including all the pixels.

The transflective reflector 29 is provided with an opening 29a formed at every spot corresponding to the respective pixels. The openings 29a are formed by photolithography process. As the aluminum film composing the transflective reflector 29 has a thickness thicker than that of the transflective reflector 27 according to the fourth embodiment, all the area of the transflective reflector 29, other than the openings 29a acts as a complete reflector, so that transmittance and reflectance can be adjusted by varying an area of the respective openings 29a. With this embodiment, the area of the respective openings 29a is set to 30% of an area of the respective pixels, thereby allowing about 30% of light rays to be transmitted while reflecting about 70% of the light rays.

The diffusion film 15 shown in FIG. 19 is installed in order to scatter light rays reflected by the transflective reflector 29, so that bright display having a wide viewing angle can be effected.

It is preferable that incident light rays entering from outside undergoes forward scattering as much as possible with less back scattering because high contrast can be obtained in this way. In this case, a light scattering type adhesive 30 μm thick composed of fine particles mixed in an adhesive is used for the diffusion film 15, and the light scattering type adhesive serves also as an adhesive for bonding the liquid crystal element 23 with the twisted retardation film 12.

The first polarizing film 11, the second polarizing film 17, the twisted retardation film 12, and the backlight 16 are the same as those used in the fourth embodiment.

The first retardation film 13 is a transparent film about 70 Am thick, formed by drawing polycarbonate (PC), and has a retardation value F1=0.14 μm, equivalent to a quarter-wavelength, at a wavelength of 0.55 μm. The second retardation film 14 is also a transparent film about 70 μm thick, formed by drawing polycarbonate (PC), and has a retardation value F2=0.28 μm, equivalent to a half-wavelength, at a wavelength of 0.55 μm.

The third retardation film 18 is also a transparent film about 70 μm thick, formed by drawing polycarbonate (PC), and has a retardation value F3=0.14 μm, equivalent to a quarter-wavelength, at a wavelength of 0.55 μm.

The fourth retardation film 19 is also a transparent film about 70 μm thick, formed by drawing polycarbonate (PC), and has a retardation value F4=0.28 μm, equivalent to a half-wavelength, at a wavelength of 0.55 μm.

A planar layout relationship among respective constituent members of the liquid crystal display device is described with reference to FIGS. 21 and 22.

Figure 21:
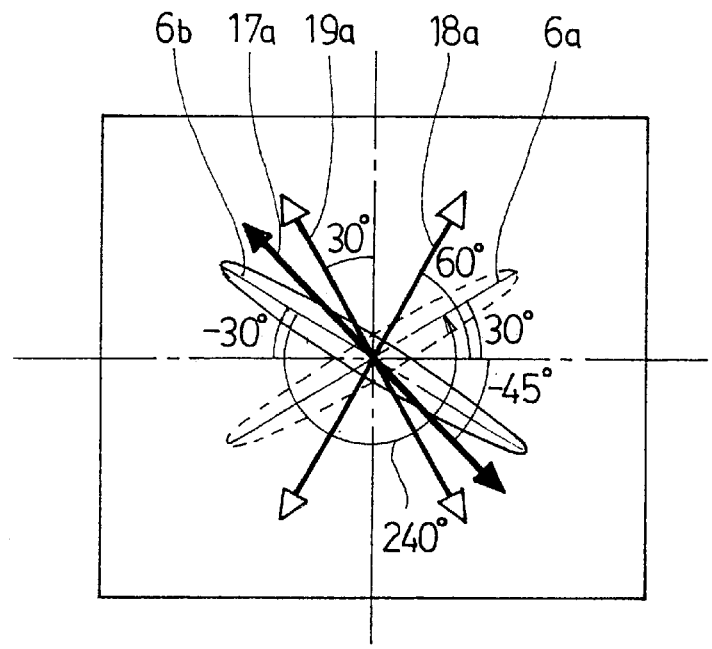
FIG. 21 is a schematic illustration showing a relationship among the direction of a transmission axis of a second polarizing film, the direction of respective phase delay axes of third and fourth retardation films, and a twist angle of nematic liquid crystal of a liquid crystal element of the liquid crystal display device.

On the surface of the first electrodes 3 and the second electrodes 4 inside the liquid crystal element 23, an alignment film (not shown) is formed, and as shown in FIG. 21, a lower molecular alignment direction 6a of the nematic liquid crystal 6 points at +30° by applying a rubbing treatment to the side of the first substrate 1 in the direction extending upward to the right at 30° relative to the horizontal axis while an upper molecular alignment direction 6b of the nematic liquid crystal 6 points at −30° by applying a rubbing treatment to the side of the second substrate 2 in the direction extending downward to the right at 30° relative to the horizontal axis.

The liquid crystal element 23 of STN mode having a twist angle Ts of 240° counterclockwise is made up by adding an optical rotatory substance called chiral to the nematic liquid crystal 6 having a viscosity at 20 cp, and adjusting a twist pitch P to 11 μm.

A birefringence difference Δn of the nematic liquid crystal 6 to be used is set at 0.15, and clearance between the first substrate 1 and the second substrate 2, that is, a cell gap d is set at 5.6 μm. Accordingly, a Δnd value Rs indicating a birefringent tendency of the liquid crystal element 23 as expressed by the product of the birefringence difference Δn of the nematic liquid crystal 6 and the cell gap d becomes 0.84 μm.

Figure 22:
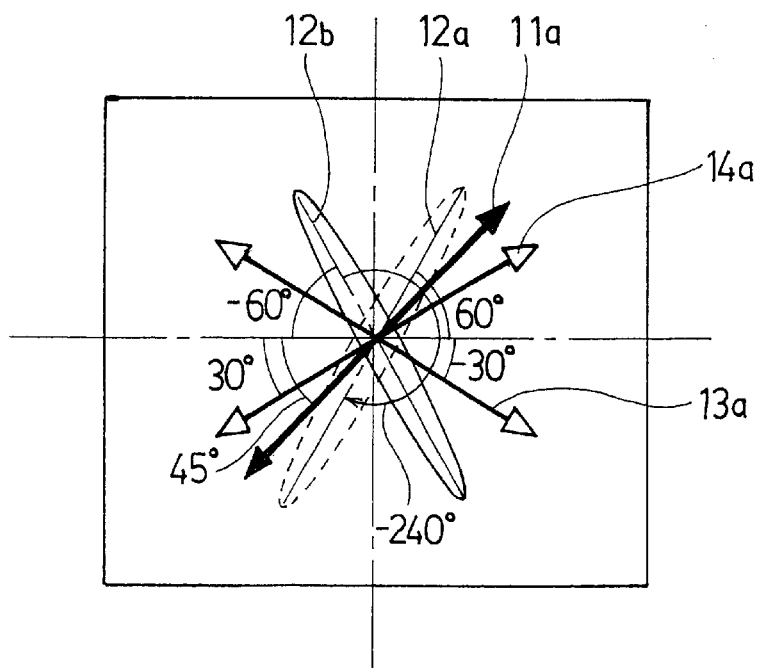
FIG. 22 is a schematic illustration showing a relationship among the direction of a transmission axis of a first polarizing film, the direction of respective phase delay axes of first and second retardation films, and a twist angle of a twisted retardation film of the liquid crystal display device.

The first polarizing film 11 is disposed such that a transmission axis 11a thereof forms an angle of +45° on the basis of the horizontal axis, as shown in FIG. 22.

Similarly as shown in FIG. 22, the twisted retardation film 12 is disposed such that a lower molecular alignment direction 12a thereof points at +60° on the basis of the horizontal axis, and an upper molecular alignment direction 12b thereof points at −60° on the basis of the horizontal axis. Accordingly, a twist angle Tc of the twisted retardation film 12 becomes 240° clockwise. Assuming that a difference in absolute value between the twist angle of the liquid crystal element 23 and that of the twisted retardation film 12 is ΔT, ΔT=|Ts|−|Tc|=0° (need only be substantially equal). Further, a Δnd value Rc of the twisted retardation film 12 is 0.80 μm, and assuming that a difference in birefringent tendency between the Δnd value Rs of the liquid crystal element 23 and the Δnd value Rc of the twisted retardation film is ΔR, ΔR=Rs−Rc=0.04 μm, indicating that both the films have substantially equal birefringent tendency.

As shown in FIG. 22, the first retardation film 13 is disposed such that a phase delay axis 13a thereof is oriented at −30° on the basis of the horizontal axis, and the second retardation film 14 is disposed such that a phase delay axis 14a thereof is oriented at +30° on the basis of the horizontal axis.

As shown in FIG. 21, the third retardation film 18 is disposed on the underside of the liquid crystal element 23 such that a phase delay axis 18a thereof is oriented at +60° relative to the horizontal axis, the fourth retardation film 19 is disposed such that a phase delay axis 19a thereof is oriented at −60° relative to the horizontal axis, and the second polarizing film 17 is disposed such that a transmission axis 17a thereof is oriented at −45° relative to the horizontal axis, thereby crossing the transmission axis 11a of the first polarizing film 11 at right angles.

With the liquid crystal display device according to this embodiment, functions of the twisted retardation film 12 and the liquid crystal element 23 are the same as those for the fourth embodiment, that is, to fully compensate birefringent tendency occurring in a liquid crystal layer so as to eliminate the birefringent tendency. Accordingly, actions of the first retardation film 13 and the second retardation film 14 at the time of reflective display are first described.

In the previously-described fourth embodiment, two sheets of the retardation films each having a different wavelength dependency of refractive index are used, however, even by use of retardation films made of constituent materials having the same wavelength dependency of refractive index, a wide-band quarter-wavelength film capable of converting light into circularly polarized light at all wavelengths in the visible light region.

With fourth embodiment, the second retardation film 14 is superposed on the first retardation film 13 such that the respective phase delay axes 14a, 13a cross each other at right angles, however, with this embodiment, as shown in FIG. 22, the second retardation film 14 is superposed on the first retardation film 13 such that the respective phase delay axes 14a, 13a form an angle of 60° therebetween.

By superposing the second retardation film 14 having a retardation value F2=0.28 μm equivalent to a half-wavelength on the first retardation film 13 having a retardation value F1=0.14 μm equivalent to a quarter-wavelength such that respective phase delay axes form an angle of 60° therebetween, a total retardation value of the two retardation films becomes 0.14 μm at a wavelength of 0.55 μm, but smaller than 0.14 μm in a short wavelength region around 0.4 μm, and greater than 0.14 μm in a long wavelength region around 0.7 μm. An effective phase delay axis for the two retardation films is oriented in the direction of the horizontal axis.

That is, even by use of two sheets of the retardation films made of a constituent material having the same wavelength dependency of refractive index, it becomes possible to form a so-called wide-band quarter-wavelength film wherein retardation values in a short wavelength region are smaller than those in a long wavelength region.

In other words, the quotients F/λ, retardation values F divided by wavelengths λ, respectively, can be rendered approximately one quarter over the entire visible light region. Consequently, circularly polarized light can be obtained at all wavelengths in the visible light region, so that perfect black display can be obtained at the time of reflective display.

In FIG. 19, components of linearly polarized light falling on the liquid crystal display device from the upper visible side through the first polarizing film 11, at all wavelengths in the visible light region, is turned into circularly polarized light after passing through the second retardation film 14 and the first retardation film 13.

Since the twisted retardation film 12 and the liquid crystal element 23 are fully compensated when no voltage is applied to the liquid crystal element 23, the circularly polarized light undergoes no change in polarization state. Further, since the diffusion film 15 is made of material having little retardation value and causing no change in polarization state, the circularly polarized light arrives at the transflective reflector 29 as it is.

The circularly polarized light reflected at the transflective reflector 29 undergoes no change even after passing through the liquid crystal element 23 and the twisted retardation film 12, however, after passing through the first retardation film 13 and the second retardation film 14, the circularly polarized light reverts to linearly polarized light with the direction of polarization rotated by 90°, and the linearly polarized light is all absorbed by the first polarizing film 11 not to be sent out to the visible side, so that perfect black display can be obtained.

For the diffusion film 15, material having little retardation value and little inclination to cause any change in polarization state is used, the diffusion film 15 may be disposed anywhere between the second substrate 2 and the first polarizing film 11, or on the outer surface of the first polarizing film 11, however, the same is preferably disposed as close to the second substrate 2 as possible in order to reduce display blurring.

Further, thickness of the second substrate 2 is preferably as thin as possible so as to reduce display blurring, and the thickness thereof is set at 0.5 mm for this embodiment. Also, the thickness of the second substrate 2 may be set as thin as 0.4 mm, and the first substrate 1 at 0.5 mm, so that the second substrate 2 is thinner than the first substrate 1.

When a predetermined voltage is applied between the first electrodes 3 and the second electrodes 4 of the liquid crystal element 23, the liquid crystal molecules of the nematic liquid crystal 6 are caused to rise, and a real Δnd value of the liquid crystal element 23 decreases. As a result, the linearly polarized light falling on the liquid crystal display device through the first polarizing film 11 is turned into circularly polarized light after passing through the second retardation film 14 and the first retardation film 13, but reverts to elliptically polarized light or linearly polarized light as a result of passing through the twisted retardation film 12 and the liquid crystal element 23.

If birefringent tendency occurring in the liquid crystal element 23 is rendered equal to one quarter wavelength by applying the voltage, the elliptically polarized light or linearly polarized light as reflected by the transflective reflector 29 is transmitted through the polarizing film 11 without being rotated, and sent out to the visible side, so that bright white display can be obtained.

Transmissive display effected when the backlight 16 is lit up is described hereinafter.

Two sheets of the third retardation film 18 and the fourth retardation film 19 also make up a wide-band quarter-wavelength film, having an effective phase delay axis oriented in the vertical direction.

Light emitted from the backlight 16 is turned into linearly polarized light after passing through the second polarizing film 17. The linearly polarized light falls on the fourth retardation film 19 at an angle of 45° relative to the effective phase delay axis of the two retardation films, that is, the third retardation film 18 and the fourth retardation film 19, and is turned into circularly polarized light. Thereafter, about 70% of the circularly polarized light is reflected by the transflective reflector 29, but remaining 30% thereof is transmitted therethrough.

In a state where no voltage is applied to the liquid crystal element 23, the twisted retardation film 12 and the liquid crystal element 23 are fully compensated, consequently, the circularly polarized light undergoes no change in polarization state, and arrives at the first retardation film 13 and the second retardation film 14 as it is.

With arrangement as in the sixth embodiment, a retardation occurring at the third retardation film 18 and the fourth retardation film 19 and a retardation occurring at the first retardation film 13 and the second retardation film 14 are subjected to subtraction, and the total reatrdation becomes zero, so that linearly polarized light arriving at the first polarizing film 11 has the direction of polarization identical to that of the linearly polarized light entering through the second polarizing film 17.

As the transmission axis 11a of the first polarizing film 11 crosses the transmission axis 17a of the second polarizing film 17 at right angles, the linearly polarized light falling on the first polarizing film 11 does not pass therethrough, but is absorbed by the first polarizing film 11 so as not to be sent out to the visible side, thereby effecting black display.

In this case, as a result of using the third retardation film 18 and the fourth retardation film 19, it is possible to effect black display better than one effected in the fourth embodiment using the third retardation film 18 only.

When a predetermined voltage is applied between the first electrodes 3 and the second electrodes 4 inside the liquid crystal element 23, the liquid crystal molecules of the nematic liquid crystal 6 are caused to rise, and a real Δnd value of the liquid crystal element 23 decreases. Consequently, the linearly polarized light entering through the second polarizing film 17 is turned into circularly polarized light after passing through the third retardation film 18 and the fourth retardation film 19, but is further turned into elliptically polarized light or linearly polarized light as a result of passing through the twisted retardation film 12 and the liquid crystal element 23.

When a retardation occurring in the liquid crystal element 23 by applying the voltage thereto is equivalent to one quarter wavelength, the elliptically polarized light or the linearly polarized light transmitted through the transflective reflector 29 will have a direction of polarization rotated by 90° when further passing through the first retardation film 13 and the second retardation film 14, thereby passing through the first polarizing film 11 to be sent out to the visible side. Accordingly, bright and white display can be effected.

Thus, with the liquid crystal display device according to the sixth embodiment, by the agency of the first polarizing film 11, the second retardation film 14, the first retardation film 13, the twisted retardation film 12, the diffusion film 15 that are disposed in sequence from the visible side, and the liquid crystal element 23 incorporating the transflective reflector 29, excellent black display and bright white display can be effected at the time of reflective display using external light while as a result of installing the third retardation film 18, the fourth retardation film 19, the second polarizing film 17, and the backlight 16 that are disposed in sequence on the side of the liquid crystal element 23 opposite from the visible side, display in high contrast can be effected by lighting up the backlight 16 in an environment where there is little external light.

Furthermore, with adoption of the transflective reflector 29 provided with the opening 29a corresponding to the respective pixels, the device is adaptable to a liquid crystal display device with emphasis on transmissive display by enlarging the respective openings 29a, and adaptable to a liquid crystal display device with emphasis on reflective display by reducing the respective openings 29a.

VARIATIONS OF THE SIXTH EMBODIMENT

With the sixth embodiment as described above, retardation films formed by uniaxial drawing of polycarbonate (PC) such that a relationship among refractive index nz in the direction of z axis, refractive index nx in the direction of drawing, and refractive index ny in the direction orthogonal thereto is expressed by the following formula: nx>ny=nz are used for the first retardation film 13 and the second retardation film 14. However, the same effect can be obtained even with the use of a so-called Z type retardation film formed by multiaxial drawing of polycarbonate (PC) such that the relationship can be expressed by the formula, nx>nz>ny, or a retardation film formed by drawing material such as polyvinylalcohol (PVA), polypropylene (PP), and so forth.

Further, with this embodiment, the retardation films are arranged such that the retardation occurring in the third retardation film 18 and the fourth retardation film 19 and the retardation occurring in the first retardation film 13 and the second retardation film 14 are subjected to subtraction, however, as with the fifth embodiment, the retardation films may be arranged such that the retardation occurring to the third retardation film 18 and the fourth retardation film 19 and the retardation occurring to the first retardation film 13 and the second retardation film 14 are added up and the sum becomes a half wavelength.

Furthermore, with this embodiment, the first retardation film 13 is disposed such that the phase delay axis 13a thereof is oriented at −30° on the basis of the horizontal axis, and the second retardation film 14 is disposed such that the phase delay axis 14a thereof is oriented at +30° on the basis of the horizontal axis, however, even if the retardation films are arranged such that the phase delay axis 13a of the first retardation film 13 is oriented at +30° while the phase delay axis 14a of the second retardation film 14 is oriented at −30°, the same effect can be obtained as long as an angle formed by the respective phase delay axes is 60°.

Similarly, with this embodiment, the third retardation film 18 is disposed such that the phase delay axis 18a thereof is oriented at +60° relative to the horizontal axis, and the fourth retardation film 19 is disposed such that the phase delay axis 19a thereof is oriented at −60° relative to the horizontal axis, however, even if the retardation films are arranged such that the phase delay axis 18a of the third retardation film 18 is oriented at −60°, and the phase delay axis 19a of the fourth retardation film 19 is oriented at +60°, the same effect can be obtained as long as an angle formed by the respective phase delay axes is 60°.

Still further, with this embodiment, the two retardation films, that is, the third retardation film 18 and the fourth retardation film 19, are provided on the underside of the liquid crystal element 23, however, as with the cases of the fourth and fifth embodiments, by use of the third retardation film 18 only, similar effects can be obtained although contrast is somewhat lowered at the time of transmissive display.

SEVENTH EMBODIMENT

FIGS. 19 to 23

A seventh embodiment of a liquid crystal display device according to the invention is described hereinafter with reference to FIGS. 19, 20 and 23.

The liquid crystal display device according to this embodiment as well differs from the liquid crystal display device according to the sixth embodiment only in respect of the type and placement angle of a third retardation film 18 and a fourth retardation film 19, the other constitution thereof is the same as that of the transflective liquid crystal display device shown in FIGS. 19 and 20, and placement directions of respective axes and so forth are also the same as those shown in FIG. 22. Accordingly, detailed description thereof is omitted.

With the seventh embodiment, the third retardation film 18 is a transparent film about 70 μm thick formed by drawing polycarbonate (PC), and has a retardation value F3=0.36 μm at a wavelength of 0.55 μm. The fourth retardation film 19 is a transparent film about 100 μm thick formed by drawing polypropylene (PP), and has a retardation value F4=0.50 μm at a wavelength of 0.55 μm.

Figure 23:
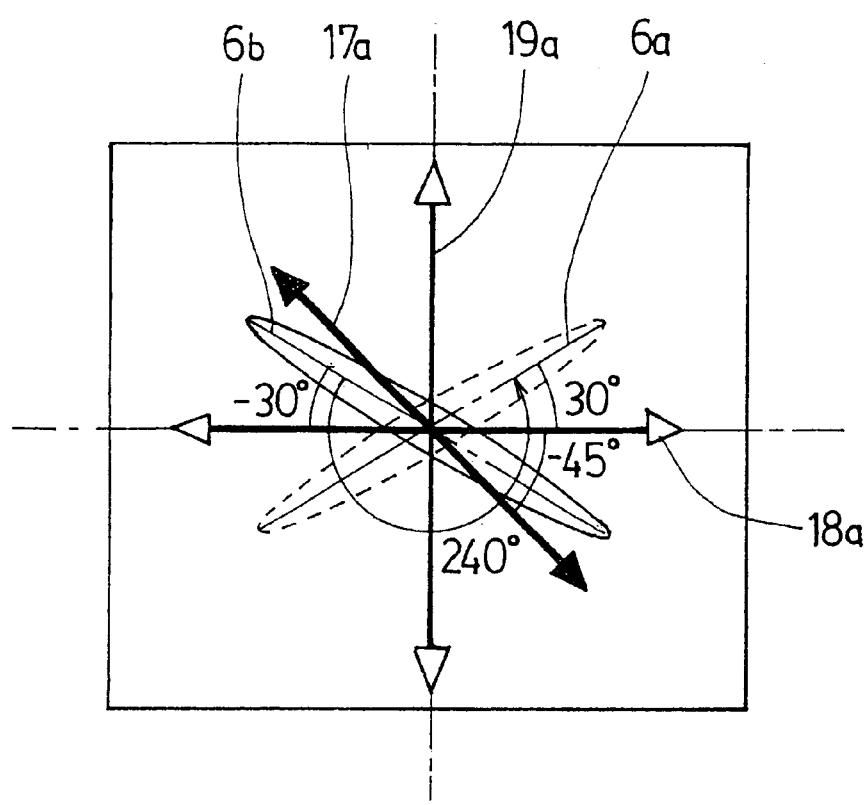
FIG. 23 is a schematic illustration showing a relationship among the direction of a transmission axis of a second polarizing film, the direction of a phase delay axis of a fourth retardation film, and a twist angle of nematic liquid crystal of a liquid crystal element of a seventh embodiment of a liquid crystal display device according to the invention.

The third retardation film 18 is disposed on the underside of a liquid crystal element 23 (on the side thereof, opposite from the visible side) such that the phase delay axis 18a thereof is oriented horizontally, different from the sixth embodiment as shown in FIG. 23, while the fourth retardation film 19 is disposed such that the phase delay axis 19a thereof is oriented vertically. Accordingly, a retardation value F3 of the third retardation film 18, and a retardation value F4 of the fourth retardation film 19 are subjected to subtraction with the result: ΔF=F4−F3=0.14 μm where ΔF is an effective retardation value. Thus, the same wide-band quarter-wavelength film as described with reference to the fourth embodiment is formed.

With the liquid crystal display device according to this embodiment as well, operation at the time of reflective display is the same as that for the sixth embodiment described above, and by use of a twisted retardation film 12, a first retardation film 13, a second retardation film 14, display in good contrast can be effected. Further, by providing a diffusion film 15, bright display having a wide viewing angle can be effected.

Now, transmissive display effected when a backlight 16 is lit up is described hereinafter. Light emitted from the backlight 16 is turned into linearly polarized light after passing through a second polarizing film 17.

The linearly polarized light falls on the fourth retardation film 19 at an angle of 45° relative to the effective phase delay axis of the wide-band quarter-wavelength film formed by the third retardation film 18 and the fourth retardation film 19, and is turned into circularly polarized light. Thereafter, about 70% of the circularly polarized light is reflected by a transflective reflector 29, but remaining 30% thereof is transmitted therethrough.

In a state where no voltage is applied to the liquid crystal element 23, the twisted retardation film 12 and the liquid crystal element 23 are fully compensated, consequently, the circularly polarized light undergoes no change in polarization state, and arrives at the first retardation film 13 and the second retardation film 14 as it is.

With this embodiment, these retardation films are disposed such that a retardation occurring in the third retardation film 18 and the fourth retardation film 19 and a retardation occurring to the first retardation film 13 and the second retardation film 14 are subjected to subtraction, and the total retardation becomes zero, so that the circularly polarized light as entered reverts to linearly polarized light having the direction of polarization rotated so as to be identical to the direction of a transmission axis 17a of the second polarizing film 17 and arrives at a first polarizing film 11.

As a transmission axis 11a of the first polarizing film 11 crosses the transmission axis 17a of the second polarizing film 17 at right angles, incident light emitted from the backlight 6 is not transmitted through the first polarizing film 11, but is absorbed thereby so as not to be sent out to the visible side, thereby effecting black display.

On the other hand, when a predetermined voltage is applied between a first electrodes 3 and a second electrodes 4 inside the liquid crystal element 23, bright white display is effected in the same way as in the case of the sixth embodiment.

Thus, with the liquid crystal display device according to the seventh embodiment as well, excellent black display and bright white display can be effected at the time of reflective display using external light, and display in high contrast can be effected by lighting up the backlight 16 even in an environment where there is little external light, similarly to the case of the liquid crystal display device according to the sixth embodiment

EIGHTH EMBODIMENT

Figure 24:
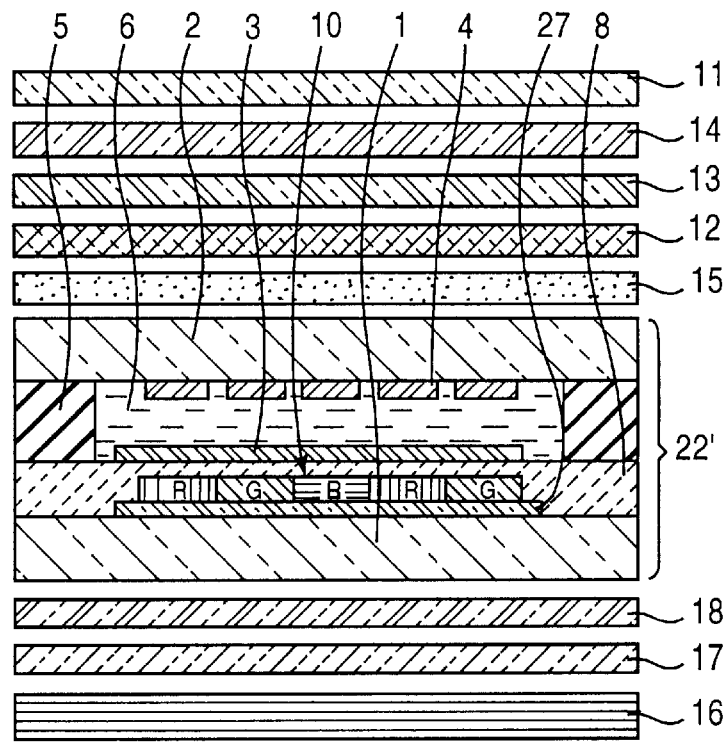
FIG. 24 is a schematic sectional view showing the constitution of an eighth embodiment of a liquid crystal display device according to the invention.
Figure 25:
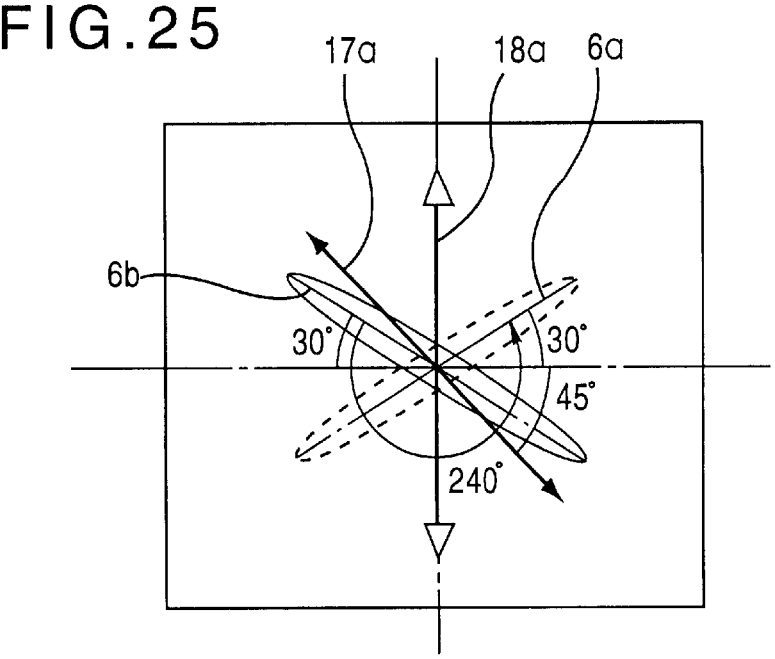
FIG. 25 is a plan view showing a planar layout relationship among the direction of a transmission axis of a second polarizing film, the direction of a phase delay axis of a third retardation film, and a twist angle of nematic liquid crystal of a liquid crystal element of the liquid crystal display device.

FIGS. 24 and 25

An eighth embodiment of a liquid crystal display device according to the invention is described hereinafter with reference to FIGS. 24 and 25

The liquid crystal display device according to the eighth embodiment differs in constitution from the previously-described liquid crystal display device according to the sixth embodiment shown in FIGS. 13 and 14 only in that a fourth retardation film is omitted, and color display can be effected due to provision of color filters.

FIG. 24 is a schematic sectional view illustrating constituent elements of the liquid crystal display device according to the eighth embodiment, and FIG. 25 is a plan view showing a planar relationship among a liquid crystal element, a second retardation film, and a third retardation film. A planar relationship among a first polarizing film, a twisted retardation film, a first retardation film, and the second retardation film is the same as FIG. 22.

As shown in FIG. 24, the liquid crystal display device according to this embodiment comprises a liquid crystal element 22', and a diffusion film 15, a twisted retardation film 12, a first retardation film 13, a second retardation film 14, and a first polarizing film 11 that are disposed in sequence on the outer side (the visible side) of a second substrate 2 of the liquid crystal element 22', together with a third retardation film 18, a second polarizing film 17, and a backlight 16 that are disposed in sequence on the outer side (the side opposite from the visible side) of a first substrate 1 of the liquid crystal element 22', thereby constituting a transflective liquid crystal display device.

The first polarizing film 11, the second retardation film 14, the first retardation film 13, and the twisted retardation film 12 are integrally joined with each other by use of an acrylic adhesive, and are pasted to the liquid crystal element 22' with the diffusion film 15.

Further, the third retardation film 18 and the second polarizing film 17 are also integrally joined with each other by use of an acrylic adhesive, and are pasted to the liquid crystal element 22' as well with an acrylic adhesive.

The liquid crystal element 22' differs from liquid crystal element of the third embodiment shown in FIGS. 9 and 10 only in that a transflective reflector 27 is substituted for the reflector 7.

More specifically, inside liquid crystal element 22', a transflective reflector 27 made of aluminum 0.02 µm thick, the color filters 10 composed of filters in three colors, red filters R, green filters G, and blue filters B 10 µm thick, a protective film 8 made of an acrylic material 2 µm thick, and a first electrodes 3 made of ITO 0.3 µm thick are formed on the inner face of a first substrate 1 composed of a glass sheet 0.5 mm thick.

The first substrate 1 is bonded with a second substrate 2 composed of a glass sheet 0.5 mm thick, provided with a second electrodes 4 made of ITO 0.05 µm thick formed on the inner face thereof, with a sealant 5, and nematic liquid crystal 6 aligned so as to be twisted by 240 degrees counterclockwise, are sandwiched between the first substrate 1 and the second substrate 2.

The transflective reflector 27 serves as a so-called half-mirror allowing a portion of incident light to pass therethrough while reflecting the rest since an aluminum film thereof is rendered very thin in thickness.

With this embodiment, since the thickness of the aluminum film is set at 0.02 µm as with the fourth embodiment, about 10 to 20% of light is transmitted while remaining 80 to 90% thereof is reflected, and the transflective reflector 27 is formed in such a way as to be common to the entire display region.

The first polarizing film 11, the twisted retardation film 12, the first retardation film 13, the second retardation film 14, the diffusion film 15, and the second polarizing film 17 are the same as those used in the sixth embodiment.

The third retardation film 18 is a transparent film about 70 µm thick, formed by drawing polycarbonate (PC), and has a retardation value F3=0.14 µm, equivalent to a quarter-wavelength, at a wavelength of 0.55 µm.

For the backlight 16, the same electroluminesecnt (EL) film emitting white light as used in the fourth to the seventh embodiments may be used, however, in carrying out this embodiment, a backlight of sidelight mode, that is, a three-wavelength type fluorescent tube attached to a light guide plate is used from the standpoint of enhancement of chroma and brightness.

The color filters 10 are comprised of filters in three colors, consisting of red filters R, green filters G, and blue filters B, and are formed in alternate and parallel stripes so as to correspond to the second electrodes 4 as shown in FIG. 10.

The respective color filters are formed to have a width wider than that of the respective second electrodes 4 so as not have a gap therebetween. It is not desirable that there exists a gap between the respective color filters 10 because this will cause white light to be mixed with display colors, and degrade color purity although a quantity of incident light is increased and display of images becomes brighter.

For improvement of brightness, the color filters 10 preferably have the maximum transmittance at an optical spectrum as high as possible, and the respective color filters preferably have the maximum transmittance of 80% or more, most preferably 90% or more. Further, the minimum transmittance thereof, at an optical spectrum, need be as high as 20 to 50%.

For the color filters 10, various types such as a pigment dispersion type, a dyeing type, a printing type, a transfer type, a electrodeposition type and so forth can be used, however, a color filter of the pigment dispersion type made by dispersing a pigment in an acrylic acid or PVA based photosensitive resin is most preferable because of heat resistance at high temperatures and high color purity.

For obtaining the color filters having such a high transmittance as described above, the transflective reflector 27 composed of a thin aluminum film is formed on the inner face of the first substrate 1, the surface of the transflective reflector 27 is inactivated by anodizing, subsequently a color resist with 10 to 15% of a pigment blended with photosensitive resin is applied to the inner face of the first substrate 1 by use of a spinner, and a exposure and development treatment is applied thereto, whereupon the color filters 10 1 μm thick having a high transmittance is obtained.

FIG. 25 shows a planar relationship among the constituent elements of the liquid crystal display device according to the eighth embodiment. The liquid crystal element 22', the twisted retardation film 12, the first retardation film 13, the second retardation film 14, the first polarizing film 11, and the second polarizing film 17 are arranged in the same way as those of the sixth embodiment shown in FIG. 22.

As shown in FIG. 25, the third retardation film 18 is disposed such that the phase delay axis 18a thereof is oriented in the vertical direction, so that a retardation value occurring to the first retardation film 13, and the second retardation film 14 is subjected to subtraction, resulting in zero.

Now, the effect of operation of the liquid crystal display device according to the eighth embodiment is described hereinafter.

Since the color filters 10 have no birefringent tendency at all, the operation of the device at the time of reflective display is the same as that for the previously-described sixth embodiment, and display in good contrast can be effected by use of the twisted retardation film 12, the first retardation film 13, and the second retardation film 14.

By combining pixels in the on (white) state with pixels in the off (black) state, color display can be effected. For example, red display can be effected by turning pixels provided with red filters R "on" (white) while turning pixels provided with green filters G and blue filters B, respectively, "off" black).

With the transflective liquid crystal display device according to this embodiment, it is possible to achieve a high reflectance, and a contrast ratio as high as 10 or more, so that bright color display having high chroma can be effected even at the time of reflective display when the backlight 16 is not lit up.

Transmissive display effected when the backlight 16 is lit up is described hereinafter.

Light emitted from the backlight 16 is turned into linearly polarized light after passing through the second polarizing film 17. The linearly polarized light falls on the third retardation film 18 at an angle of 45° relative to the phase delay axis 18a thereof, and thereby is turned into circularly polarized light. Thereafter, about 80% of the circularly polarized light is reflected by the transflective reflector 27, but remaining 20% thereof is transmitted therethrough.

In a state where no voltage is applied to the liquid crystal element 22', the twisted retardation film 12 and the liquid crystal element 22' are fully compensated, consequently, the circularly polarized light undergoes no change in polarization state, and arrives at the first retardation film 13 and the second retardation film 14 as it is.

With this embodiment, since the retardation films are disposed such that a retardation occurring at the third retardation film 18 is subtracted from a retardation occurring at the first retardation film 13 and the second retardation film 14 the total retardation becomes zero, and consequently, the circularly polarized light reverts to linearly polarized light with the direction of polarization, rotated so as to be identical to the direction of the transmission axis 17a of the second polarizing film 17.

Since the transmission axis 11a of the first polarizing film 11 crosses the transmission axis 17a of the second polarizing film 17 at right angles, the linearly polarized light arriving at the first polarizing film 11 is absorbed thereby, and is not sent out to the visible side, thereby effecting black display.

When a predetermined voltage is applied between the first electrodes 3 and the second electrodes 4 inside the liquid crystal element 22', bright white display is effected as with the case of the sixth embodiment.

With this embodiment, a fourth retardation film is not adopted, and a retardation film on the side of the backlight 16 is nothing but the third retardation film 18 only. Accordingly, at the time of transmissive display, a quarter-wavelength can not be obtained across the entire wavelength range, and consequently, a blackness level is somewhat deteriorated in comparison with the case of the sixth embodiment or the seventh embodiment, however, display is little affected due to presence of the color filters.

Thus, by the agency of the first polarizing film 11, the second retardation film 14, the first retardation film 13, the twisted retardation film 12 that are disposed in sequence from the visible side, and the liquid crystal element 22' incorporating the diffusion film 15, the transflective reflector 27, and the color filters 10, color display in good contrast can be effected at the time of reflective display using external light. Further, as a result of installing the third retardation film 18, the second polarizing film 17, and the backlight 16 that are disposed in sequence on the side of the liquid crystal element 22' opposite from the visible side, excellent color display can be effected by lighting up the backlight 16 in an environment where external light is little.

VARIATIONS OF THE EIGHTH EMBODIMENT

With the eighth embodiment, the third retardation film 18, the second polarizing film 17, and the backlight only are installed on the side of the liquid crystal element 22' opposite from the visible side, however, if the third retardation film 18, the fourth retardation film 19, the second polarizing film 17, and the backlight 16 are installed as with the case of the sixth embodiment or the seventh embodiment, contrast at the time of transmissive display is further improved, and excellent color display can be effected.

Further, with this embodiment, for the first retardation film 13 and the second retardation film 14, the constituent material having the same wavelength dependency of reflectance is used, and both the retardation films 13, 14 are disposed such that respective phase delay axes thereof cross each other so as to form an angle of 60° therebetween, however, as with the fourth embodiment or the fifth embodiment, two retardation films each made of a constituent material having different wavelength dependency of refractive index, may be disposed such that respective phase delay axes thereof cross each other at right angles.

Still further, with this embodiment, the color filters 10 are installed on the side of the first substrate 1, however, the color filters 10 may be formed on the inner side of the second substrate 2, and between the second electrodes 4 and the second substrate 2. However, the color filters 10 are preferably installed on the side of the first substrate 1 because the protective film 8 can serve for planarization of the color filters 10, doubling as an insulating film between the transflective reflector 27 and the first electrodes 3.

Furthermore, with this embodiment, for the color filters 10, the filters in three colors of red, green and blue are used, however, with the use of color filters in three colors of cyan, yellow and magenta, similar bright color display can be effected as well.

Also, with this embodiment, in forming the transflective reflector 27, the surface of a thin aluminum film is inactivated by anodizing so as to be able to withstand a cleaning operation in the fabrication process of the color filters, however, a transparent thin film such as a silicon oxide ($SiO_2$) film may be formed on the thin aluminum film instead by the sputtering method or chemical vapor deposition method (CVD).

INDUSTRIAL APPLICABILITY

As is evident from the foregoing description, the invention can provide a reflection-type liquid crystal display device of single polarizing film type, comprised of a twisted retardation film, first and second retardation films, and a first polarizing film that are disposed in sequence on the visible side of a liquid crystal element incorporating a reflector, and capable of effecting bright reflective display in high contrast by use of external light.

The invention can also provide a transflective liquid crystal display device, capable of effecting transmissive display when a backlight is lit up as well as display in high contrast using external light by substituting a transflective reflector for the reflector, and by disposing a third retardation film, a second polarizing film, and the backlight in sequence on the side of the liquid crystal element opposite from the visible side.

The liquid crystal display device is available for widespread application as a display unit for various electronic equipment such as cellular phones, portable digital assistants (PDA), portable PCs, game machines, timepieces, video cameras, and so on.

What is claimed is:

1. A liquid crystal display device comprising:
a liquid crystal element comprised of twisted nematic liquid crystal sandwiched between a first substrate provided with a reflector and first electrodes, and a second substrate provided with second electrodes;
a twisted retardation film disposed on the outer side of the second substrate;
a first non-twisted retardation film disposed on the outer side of the twisted retardation film;
a second non-twisted retardation film disposed on the outer side of the first retardation film; and
a polarizing film disposed on the outer side of the second retardation film.

2. A liquid crystal display device according to claim 1,
wherein a twist direction of the twisted retardation film is opposite to a twist direction of the liquid crystal element,
a twist angle of the twisted retardation film is substantially equal to a twist angle of the liquid crystal element,
a Δnd value indicating birefringent tendency of the twisted retardation film is substantially equal to a Δnd value of the liquid crystal element,
a phase delay axis of the first retardation film crosses a phase delay axis of the second retardation film substantially at right angles, and
wavelength dependency of retardation value of the first retardation film differs from wavelength dependency of retardation value of the second retardation film.

3. A liquid crystal display device according to claim 1,
wherein a twist direction of the twisted retardation film is opposite to a twist direction of the liquid crystal element,
a twist angle of the twisted retardation film is substantially equal to a twist angle of the liquid crystal element,
a Δnd value indicating birefringent tendency of the twisted retardation film is substantially equal to a Δnd value of the liquid crystal element,
a phase delay axis of the first retardation film crosses a phase delay axis of the second retardation film so as to form substantially an angle of 60° therebetween, and
retardation value of the first retardation film is substantially equivalent to a quarter-wavelength while retardation value of the second retardation film is substantially equivalent to a half-wavelength.

4. A liquid crystal display device according to claim 1,
wherein color filters are installed on the nematic liquid crystal side of the first substrate than the reflector, or on the nematic liquid crystal side of the second substrate.

5. A liquid crystal display device according to claim 2,
wherein the twist angle of the twisted retardation film is slightly greater than the twist angle of the liquid crystal element.

6. A liquid crystal display device according to claim 1,
wherein a diffusion film is installed on the outer side of the second substrate.

7. A liquid crystal display device according to claim 1,
wherein the first electrodes are reflective electrodes formed of a reflective material, doubling as the reflector.

8. A liquid crystal display device comprising:
a liquid crystal element comprised of twisted nematic liquid crystal sandwiched between a first substrate provided with a transflective reflector and first electrodes, and a second substrate provided with second electrodes;
a twisted retardation film disposed on the outer side of the second substrate;

a first retardation film disposed on the outer side of the twisted retardation film;

a second retardation film disposed on the outer side of the first retardation film;

a first polarizing film disposed on the outer side of the second retardation film;

a third retardation film disposed on the outer side of the first substrate;

a second polarizing film disposed on the outer side of the third retardation film; and a backlight disposed on the outer side of the second polarizing film, wherein retardation value of the third retardation film is substantially equivalent to a quarter-wavelength.

9. A liquid crystal display device according to claim 8, wherein a fourth retardation film is installed between the third retardation film and the second polarizing film, a phase delay axis of the third retardation film crosses a phase delay axis of the fourth retardation film so as to form substantially an angle of 60° therebetween, and retardation value of the third retardation film is substantially equivalent to a quarter-wavelength while retardation value of the fourth retardation film is substantially equivalent to a half-wavelength.

10. A liquid crystal display device according to claim 8, wherein a fourth retardation film is installed between the third retardation film and the second polarizing film, a phase delay axis of the third retardation film crosses a phase delay axis of the fourth retardation film substantially at right angles, wavelength dependency of retardation value of the third retardation film differs from wavelength dependency of retardation value of the fourth retardation film, and the difference between the retardation value of the third retardation film and the retardation value of the fourth retardation film is substantially equivalent to a quarter-wavelength.

11. A liquid crystal display device according to claim 8, wherein a twist direction of the twisted retardation film is opposite to a twist direction of the liquid crystal element, a twist angle of the twisted retardation film is substantially equal to a twist angle of the liquid crystal element, a $\Delta nd$ value indicating birefringent tendency of the twisted retardation film is substantially equal to a $\Delta nd$ value of the liquid crystal element, a phase delay axis of the first retardation film crosses a phase delay axis of the second retardation film so as to form substantially an angle of 60° therebetween, and retardation value of the first retardation film is substantially equivalent to a quarter-wavelength while retardation value of the second retardation film are substantially equivalent to a half-wavelength.

12. A liquid crystal display device according to claim 9, wherein a twist direction of the twisted retardation film is opposite to a twist direction of the liquid crystal element, a twist angle of the twisted retardation film is substantially equal to a twist angle of the liquid crystal element, a $\Delta nd$ value indicating birefringent tendency of the twisted retardation film is substantially equal to a $\Delta nd$ value of the liquid crystal element, a phase delay axis of the first retardation film crosses a phase delay axis of the second retardation film so as to form substantially an angle of 60° therebetween, and retardation value of the first retardation film is substantially equivalent to a quarter-wavelength while retardation value of the second retardation film is substantially equivalent to a half-wavelength.

13. A liquid crystal display device according to claim 10, wherein a twist direction of the twisted retardation film is opposite to a twist direction of the liquid crystal element, a twist angle of the twisted retardation film is substantially equal to a twist angle of the liquid crystal element, a $\Delta nd$ value indicating birefringent tendency of the twisted retardation film is substantially equal to a $\Delta nd$ value of the liquid crystal element, a phase delay axis of the first retardation film crosses a phase delay axis of the second retardation film so as to form substantially an angle of 60° therebetween, and retardation values of the first retardation film is substantially equivalent to a quarter-wavelength while retardation values of the second retardation film is substantially equivalent to a half-wavelength.

14. A liquid crystal display device according to claim 8, wherein a twist direction of the twisted retardation film is opposite to a twist direction of the liquid crystal element, a twist angle of the twisted retardation film is substantially equal to a twist angle of the liquid crystal element, a $\Delta nd$ value indicating birefringent tendency of the twisted retardation film is substantially equal to a $\Delta nd$ value of the liquid crystal element, a phase delay axis of the first retardation film crosses a phase delay axis of the second retardation film substantially at right angles, wavelength dependency of retardation value of the first retardation film differs from wavelength dependency of retardation value of the second retardation film, and the difference between the retardation value of the first retardation film and the retardation values of the second retardation film is substantially equivalent to a quarter-wavelength.

15. A liquid crystal display device according to claim 9, wherein a twist direction of the twisted retardation film is opposite to a twist direction of the liquid crystal element, a twist angle of the twisted retardation film is substantially equal to a twist angle of the liquid crystal element, a $\Delta nd$ value indicating birefringent tendency of the twisted retardation film is substantially equal to a $\Delta nd$ value of the liquid crystal element, a phase delay axis of the first retardation film crosses a phase delay axis of the second retardation film substantially at right angles, wavelength dependency of retardation value of the first retardation film differs from wavelength dependency of retardation value of the second retardation film, and the difference between the retardation value of the first retardation film and the retardation value of the second retardation film is substantially equivalent to a quarter-wavelength.

16. A liquid crystal display device according to claim 10, wherein a twist direction of the twisted retardation film is opposite to a twist direction of the liquid crystal element, a twist angle of the twisted retardation film is substantially equal to a twist angle of the liquid crystal element, a Δnd value indicating birefringent tendency of the twisted retardation film is substantially equal to a Δnd value of the liquid crystal element, a phase delay axis of the first retardation film crosses a phase delay axis of the second retardation film substantially at right angles, wavelength dependency of retardation value of the first retardation film differs from wavelength dependency of retardation value of the second retardation film, and the difference between the retardation value of the first retardation film and the-retardation value of the second retardation film is substantially equivalent to a quarter-wavelength.

17. A liquid crystal display device according to claim 11, wherein the twist angle of the twisted retardation film is slightly greater than the twist angle of the liquid crystal element.

18. A liquid crystal display device according to claim 8, wherein color filters are installed on the nematic liquid crystal side of the first substrate than the reflector, or on the nematic liquid crystal side of the second substrate.

19. A liquid crystal display device according to claim 8, wherein a diffusion film is installed on the outer side of the second substrate.

20. A liquid crystal display device according to claim 8, wherein the transflective reflector is a thin metal film having a thickness in a range of 0.01 to 0.03 μm.

21. A liquid crystal display device according to claim 8, wherein the transflective reflector is a thin metal film provided with an opening at every spot corresponding to respective pixels.

22. A liquid crystal display device according to claim 1, wherein the twisted retardation film has a fixed twist state at room temperature.

23. A liquid crystal display device according to claim 1, wherein no additional electrodes of the device are disposed outside of the liquid crystal element, whereby the twisted retardation film is not exposed to electrode voltage.

* * * * *